(12) United States Patent
Nonaka

(10) Patent No.: US 8,711,317 B2
(45) Date of Patent: Apr. 29, 2014

(54) COLOR IMAGE DISPLAY DEVICE, COLOR FILTER SUBSTRATE, COLOR PIXEL ARRAY SUBSTRATE, AND ELECTRONIC DEVICE

(71) Applicant: NLT Technologies, Ltd., Kanagawa (JP)

(72) Inventor: Yoshihiro Nonaka, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/866,402

(22) Filed: Apr. 19, 2013

(65) Prior Publication Data

US 2013/0300965 A1    Nov. 14, 2013

Related U.S. Application Data

(62) Division of application No. 12/778,753, filed on May 12, 2010, now Pat. No. 8,451,414.

(30) Foreign Application Priority Data

May 13, 2009   (JP) ................................. 2009-117061
Apr. 21, 2010   (JP) ................................. 2010-097450

(51) Int. Cl.
*G02F 1/1343*   (2006.01)

(52) U.S. Cl.
USPC ......................................................... 349/146

(58) Field of Classification Search
USPC ......................................................... 349/146
See application file for complete search history.

(56) References Cited

U.S. PATENT DOCUMENTS

| 2006/0109412 | A1 | 5/2006 | Hsiao et al. |
| 2007/0188497 | A1 | 8/2007 | Dowling et al. |
| 2009/0128672 | A1 | 5/2009 | Watanabe |
| 2010/0156950 | A1 | 6/2010 | Pak |

FOREIGN PATENT DOCUMENTS

| CN | 1967635 A | 5/2007 |
| CN | 101233552 A | 7/2008 |
| JP | 04-177986 A | 6/1992 |
| JP | 2000-249823 A | 9/2000 |
| JP | 2004-094167 A | 3/2004 |
| JP | 2005-166691 A | 6/2005 |

(Continued)

OTHER PUBLICATIONS

Office Action issued by Chinese Patent Office in Chinese Application No. 201010180953.2 dated Jun. 21, 2013.

(Continued)

*Primary Examiner* — Eric Wong
(74) *Attorney, Agent, or Firm* — Sughrue Mion, PLLC

(57) ABSTRACT

Provided is a color filter substrate including: an end portion unit pixel including a plurality of kinds of end portion sub-pixels which correspond to a plurality of kinds of primary colors respectively in a one-to-one relationship; and an inner unit pixel including a plurality of kinds of inner sub-pixels which correspond to the plurality of kinds of primary colors respectively in a one-to-one relationship, wherein a relative area proportion of the end portion sub-pixels is set equal to that of the inner sub-pixels; and wherein the plurality of kinds of the end portion sub-pixels is arrayed in accordance with a position or a shape on an outer edge of the display region, an array direction of the plurality of kinds of the end portion sub-pixels and an array direction of the plurality of kinds of the inner sub-pixels configured to intersect each other.

4 Claims, 13 Drawing Sheets

(56) References Cited

FOREIGN PATENT DOCUMENTS

| | | |
|---|---|---|
| JP | 2005-315960 A | 11/2005 |
| JP | 2005-316169 A | 11/2005 |
| JP | 2008-216356 A | 9/2006 |
| JP | 2006-276359 A | 10/2006 |
| JP | 2006-276580 A | 10/2006 |
| JP | 2008-216357 A | 9/2008 |
| JP | 2009-047774 A | 3/2009 |
| JP | 2009-092981 A | 4/2009 |
| WO | 93/04460 A1 | 3/1993 |
| WO | 2007132574 A1 | 11/2007 |
| WO | 2009057342 A1 | 5/2009 |

OTHER PUBLICATIONS

Office Action issued by Japanese Patent Office in Japanese Patent Application No. 2010-097450 dated Oct. 22, 2013.

COLOR IMAGE DISPLAY DEVICE, COLOR FILTER SUBSTRATE, COLOR PIXEL ARRAY SUBSTRATE, AND ELECTRONIC DEVICE

INCORPORATION BY REFERENCE

This application is a Divisional of U.S. patent application Ser. No. 12/778,753, filed on May 12, 2010, which claims priority from Japanese Patent Application Nos. 2009-117061 filed May 13, 2009 and 2010-097450 filed Apr. 21, 2010, the contents of all of which are incorporated herein by reference in their entirety.

BACKGROUND OF THE INVENTION

1. Field of the Invention

The present invention relates to a color image display device, a color filter substrate, a color pixel array substrate, and an electronic device and, more specifically to, a color image display device, a color filter substrate, a color pixel array substrate, an image display device, and an electronic device by which an outer edge of an image display region have a non-rectangular shape in part or as a whole.

2. Description of the Related Art

An image display device is used often in the case of outputting various kinds of display information in an image such as characters or illustrations in a condition where it is mounted not only on a single apparatus but also on a variety of apparatuses. In particular, a thin-type image display device such as a recently prevailing liquid crystal display (LCD) is mounted on a mobile terminal apparatus such as a cellular phone because of its feature of being lightweight also. In the type of image display device, desirably its display region is shaped not only into a rectangle with four right-angled corners but also into a non-rectangle such as a circle or an ellipsoid (see, for example, Patent Document 1 (Japanese Patent Application Laid Open Publication No. Hei04-177986); Patent Document 2 (WO93/04460); and Patent Document 3 (Japanese Patent Application Laid Open Publication No. 2006-276359)).

As this type of image display devices, one such is known that it is mounted, for example, on the right surface side of a cellular phone and the image display region of this device is made circular in shape so that outsides of the outer edge of this region may be covered over with a circularly-opened frame member.

It is here assumed that in order to provide color display on a screen of this device, each unit pixel of its image display region includes a sub-pixel which turns red (R), that which turns green (G), and that which turns blue (B) respectively of the three primary colors. To make the image display region circular, it is covered with a light-shielding layer 180 that nearly matches its outer edge (region border line) 160a as shown in FIG. 20. By doing so, in an inner unit pixel 20 in this region, the R-, G-, and B-inner sub-pixels 20r, 20g, and 20b of this unit pixel are all exposed so that color balance may be maintained. In contrast to it, in an end portion unit pixel 101 along the outer edge 160a, any one of R-, G-, and B-end portion sub-pixels 101r, 101g, and 101b may be covered with the light-shielding layer 180 to resultantly produce a difference in exposure area between them; this difference disturbs the color balance, giving rise to so-called coloring. It is to be noted that in the figure the characters of "R", "G", and "B" indicated on the respective sub-pixels are not really displayed on their surfaces but just are given for facilitating understanding (which holds true also in the drawings described hereinafter).

Accordingly, to maintain the color balance, Patent Document 4 (Japanese Patent Application Laid Open Publication No. 2006-276580) proposes reducing differences in light development area among the end portion sub-pixels by changing the width of a black matrix which shields from light the light development regions of the R-, G-, and B-end portion sub-pixels making up the end portion unit pixel and the width itself of each of those end portion sub-pixels.

Further, to suppress coloring, Patent Document 5 (Japanese Patent Application Laid Open Publication No. 2005-315960) proposes reducing the relative differences in area among the end portion sub-pixels by improving the degree of display fineness by decreasing the area of each of the R-, G-, and B-end portion sub-pixels making up the end portion unit pixel.

However, in the case of the related technologies described in Patent Document 4, if the end portion sub-pixels 101r of the end portion unit pixel 101 is mostly covered over with the light-shielding layer 180 as shown in FIG. 21, it is difficult to maintain the color balance only by adjustment of the black matrix width etc.

Further, the related technologies described in Patent Document 5 cannot accommodate a case where the R-, G-, and B-end portion sub-pixels making up the end portion unit pixel are covered over with the light-shielding layer in an indefinite shape, because those technologies intend only to reduce the areas of those end portion sub-pixels in order to suppress coloring at the end portions in the rectangular-shaped image display region. That is, similar to the related technologies described in Patent Document 4, even those described in Patent Document 5 may find it difficult to maintain color balance if there occurs a difference in area ratio among the end portion sub-pixels. Further, various circuit components which operate the end portion unit pixels cannot be arranged in much the same way as the inner unit pixels and so need to be set up in a small region corresponding to the end portion sub-pixels. Accordingly, the LCD, for example, may find it difficult in some cases to dispose in a small region a variety of components such as a switching active element, a storage capacitor, and a transparent pixel electrode that make up each pixel circuit.

SUMMARY OF THE INVENTION

In view of the above, it is an object of the present invention to provide a color image display device, a color filter substrate, a color pixel array substrate, and an electronic device which is capable of displaying an image with no differences in color balance between end portions and inner portions of a non-rectangle image display region.

According to a first aspect of the present invention, there is provided a color image display device including: an end portion unit pixel formed in an edge portion of a display region in which a color image is displayed and including a plurality of kinds of end portion sub-pixels which each correspond to any one of a plurality of kinds of primary colors in a one-to-one relationship; and an inner unit pixel formed in an inside of the display region with respect to the end portion unit pixels and including a plurality of kinds of inner sub-pixels which each correspond to any one of the plurality of kinds of primary colors in a one-to-one relationship, wherein a relative area proportion of the end portion sub-pixels for each primary color is set to be essentially equal to that of the inner sub-pixels for each primary color; and wherein the plurality of kinds of the end portion sub-pixels is arrayed in accordance with a position or a shape on an outer edge of the display region, an array direction of the plurality of kinds of the end portion sub-pixels and an array direction of the plurality of kinds of the inner sub-pixels configured to intersect each other.

According to a second aspect of the present invention, there is provided a color filter substrate including: an end portion unit pixel formed in an edge portion of a display region in which a color image is displayed and including a plurality of kinds of end portion sub-pixels which correspond to a plurality of kinds of primary colors respectively in a one-to-one relationship; and an inner unit pixel formed in an inside of the display region with respect to the end portion unit pixels and including a plurality of kinds of inner sub-pixels which correspond to the plurality of kinds of primary colors respectively in a one-to-one relationship, wherein a relative area proportion of the end portion sub-pixels that correspond to the primary colors respectively in a one-to-one relationship is set equal to that of the inner sub-pixels that correspond to the primary colors respectively in a one-to-one relationship; and wherein the plurality of kinds of the end portion sub-pixels is arrayed in accordance with a position or a shape on an outer edge of the display region, an array direction of the plurality of kinds of the end portion sub-pixels and an array direction of the plurality of kinds of the inner sub-pixels configured to intersect each other.

According to a third aspect of the present invention, there is provided an image display device including an image display region including an end portion unit pixel formed in an edge portion of a display region in which a color image is displayed and including a plurality of kinds of end portion sub-pixels which correspond to a plurality of kinds of primary colors respectively in a one-to-one relationship and an inner unit pixel formed in an inside of the display region with respect to the end portion unit pixels and including a plurality of kinds of inner sub-pixels which correspond to the plurality of kinds of primary colors respectively in a one-to-one relationship, the end portion unit pixel is set smaller in area than the inner unit pixel a relative area proportion of the end portion sub-pixels that correspond to the primary colors respectively in a one-to-one relationship is set equal to that of the inner sub-pixels that correspond to the primary colors respectively in a one-to-one relationship; and wherein the plurality of kinds of the end portion sub-pixels is arrayed in accordance with a position or a shape on an outer edge of the display region, an array direction of the plurality of kinds of the end portion sub-pixels and an array direction of the plurality of kinds of the inner sub-pixels configured to intersect each other.

According to a fourth aspect of the present invention, there is provided an electronic device provided with an image display device including an end portion unit pixel formed in an edge portion of a display region in which a color image is displayed and including a plurality of kinds of end portion sub-pixels which correspond to a plurality of kinds of primary colors respectively in a one-to-one relationship and an inner unit pixel formed in an inside of the display region with respect to the end portion unit pixels and including a plurality of kinds of inner sub-pixels which correspond to the plurality of kinds of primary colors respectively in a one-to-one relationship, wherein a relative area proportion of the end portion sub-pixels that correspond to the primary colors respectively in a one-to-one relationship is set equal to that of the inner sub-pixels that correspond to the primary colors respectively in a one-to-one relationship; and wherein the plurality of kinds of the end portion sub-pixels is arrayed in accordance with a position or a shape on an outer edge of the display region, an array direction of the plurality of kinds of the end portion sub-pixels and an array direction of the plurality of kinds of the inner sub-pixels configured to intersect each other.

With the above configurations, the end portion sub-pixels are arrayed in a direction different from that of the inner sub-pixels in accordance with a position or a shape along the outer edge of the color image display region. Therefore, it is possible to avoid any one of the end portion sub-pixels from being covered greatly and set an equal R-, G-, and B-area proportion to both the inner sub-pixels and the end portion sub-pixels respectively.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Figure 1:
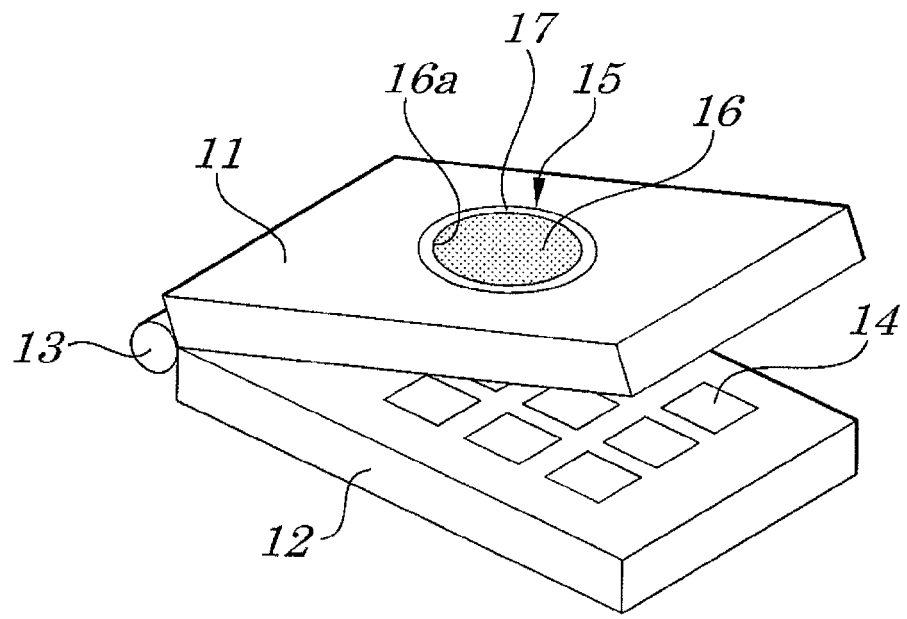
FIG. 1 is a perspective view for showing outer appearances of a cellular phone on which an image display device according to a first exemplary embodiment of the present invention is mounted.

Best modes of carrying out the present invention will be described in further detail using various embodiments with reference to the accompanying drawings.

A color image display device according to the preferred exemplary embodiment includes an end portion unit pixel formed in an edge portion of a display region in which a color image is displayed and including a plurality of kinds of end portion sub-pixels which each correspond to any one of a plurality of kinds of primary colors in a one-to-one relationship; and an inner unit pixel formed in an inside of the display region with respect to the end portion unit pixels and including a plurality of kinds of inner sub-pixels which each correspond to any one of the plurality of kinds of primary colors in a one-to-one relationship.

A relative area proportion of the end portion sub-pixels for each primary color is set to be essentially equal to that of the inner sub-pixels for each primary color. The plurality of kinds of the end portion sub-pixels is arrayed in accordance with a position or a shape on an outer edge of the display region. An array direction of the plurality of kinds of the end portion sub-pixels and an array direction of the plurality of kinds of the inner sub-pixels are configured to intersect each other.

In the foregoing, a preferable mode is one wherein the end portion unit pixel is formed in such a manner that the plurality of kinds of the end portion sub-pixels extends in a direction orthogonal to a region borderline between the display region and non-display region of the color image which are adjacent to each other, or a pixel borderline between the end portion unit pixels and the inner unit pixels which are adjacent to each other on the opposite side with respect to the region borderline.

Also, a preferable mode is one wherein the end portion unit pixel is formed in such a manner that the plurality of kinds of the end portion sub-pixels arrayed along a region borderline between the display region and non-display region of the color image which are adjacent to each other, the region borderline configured to be in parallel with a pixel borderline between the end portion unit pixels and the inner unit pixels which are adjacent to each other on the opposite side with respect to the region borderline.

Furthermore, a preferable mode is one wherein the end portion unit pixel is formed in such a manner that the plurality of kinds of the end portion sub-pixels is defined by a region borderline between the display region and non-display region of the color image which are adjacent to each other and two pixel borderlines, orthogonal to each other, between the end portion unit pixel and the inner unit pixels which are adjacent to each other, and that the end portion sub-pixels are arrayed along the region borderline.

Still furthermore, a preferable mode is one wherein the end portion unit pixel is configured to change a width of a pixel borderline between the end portion unit pixel and the inner unit pixel that are adjacent to each other along the array direction of the end portion sub-pixels, in such a manner that the relative area proportion of the end portion sub-pixels making up the end portion unit pixel is set to be approximately equal to that of the inner sub-pixels making up the inner unit pixel.

First Exemplary Embodiment

A description will be given in detail of the exemplary embodiments of the present invention with respect to the drawings as follows.

Figure 2:
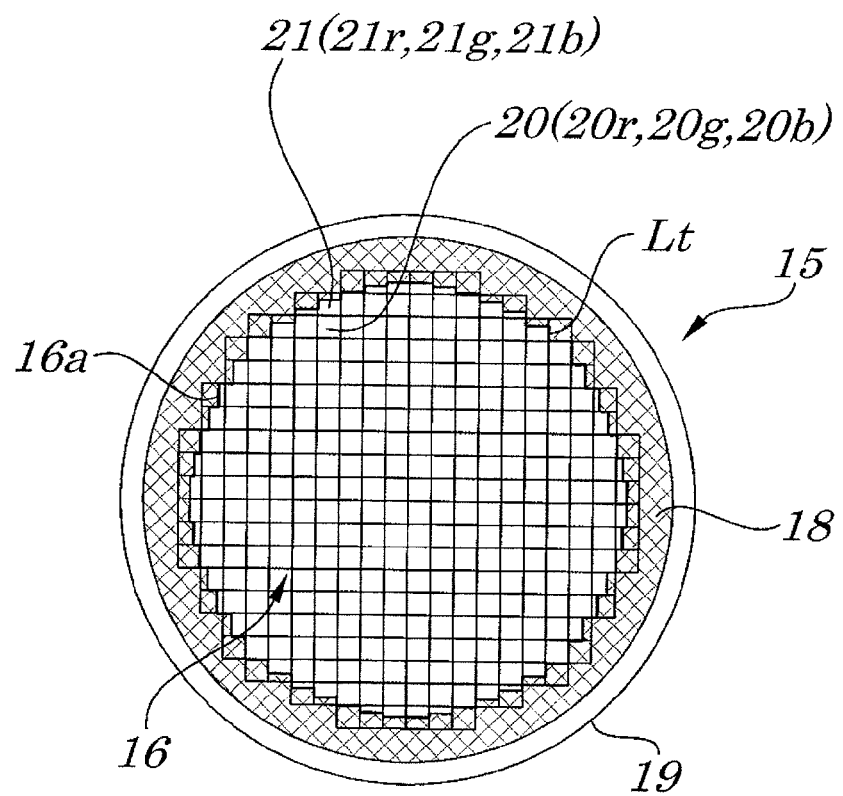
FIG. 2 is a plan view for showing an image display region of the image display device.
Figure 3:
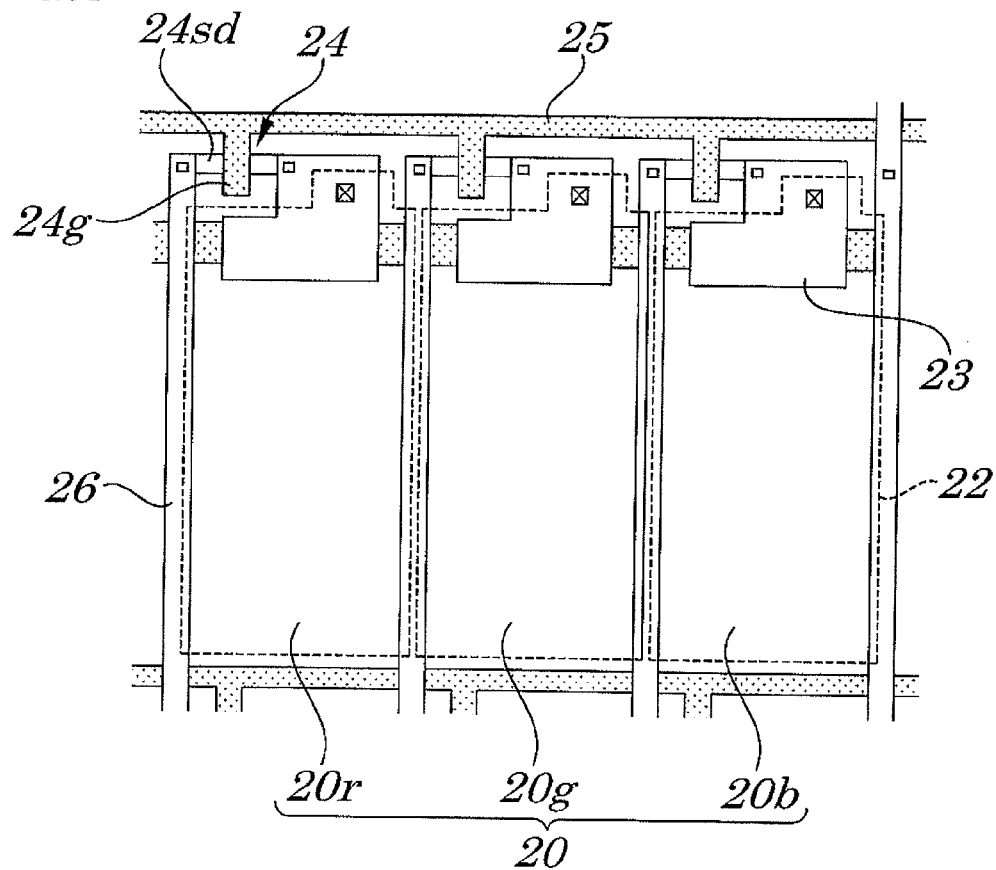
FIG. 3 is a partially enlarged plan view for showing a layout of a circuit region and a pixel region on a color filter substrate of the image display device.
Figure 4:
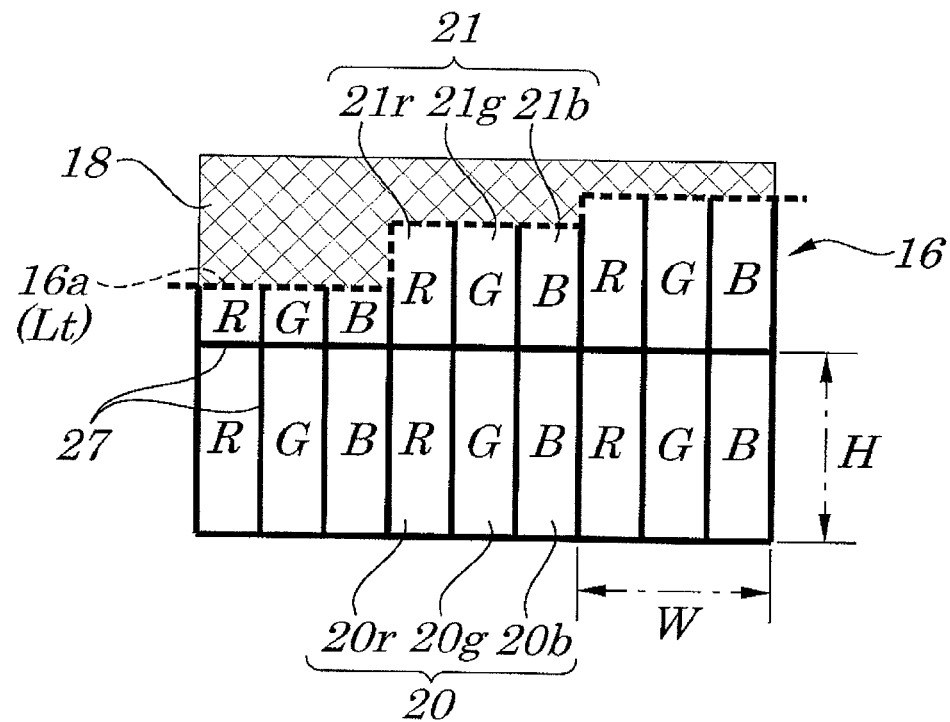
FIG. 4 is a partially enlarged plan view for showing one enlarged portion of a pixel arrangement around one end portion of the image display region of the image display device.
Figure 5:
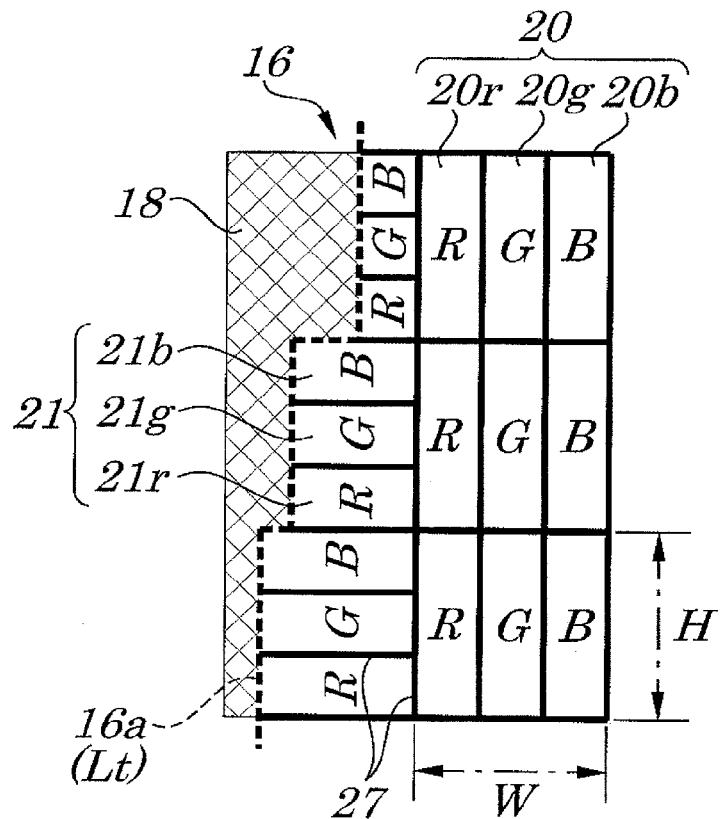
FIG. 5 is a partially enlarged plan view for showing a pixel arrangement around another end portion of the image display region of the image display device.

FIG. 1 is a perspective view for showing the outer appearances of a cellular phone on which to mount an image display device according to the first exemplary embodiment of the present invention, FIG. 2 is a plan view for showing an image display region of the image display device, FIG. 3 is a partially enlarged plan view for showing a layout of a circuit region and a pixel region on a color filter substrate of the image display device, FIG. 4 is a partially enlarged plan view for showing one enlarged portion of a pixel arrangement around one end portion of the image display region of the image display device, and FIG. 5 is a partially enlarged plan view for showing a pixel arrangement around another end portion of the image display region of the image display device.

The cellular phone (electronic device) of the present exemplary embodiment is designed into a so-called clamshell type structure in which an operation enclosure case 12 and a display enclosure case 11 are respectively formed into thin boxes with nearly the same shapes and configured to relatively swing around a hinge section 13 in facing and separating directions, as shown in FIG. 1. The operation enclosure case 12 has an operation section made up of a variety of operation keys 14 arrayed on its surface side that faces the display enclosure case 11 and also has a built-in microphone (not shown) so that it may serve also as a microphone-side enclosure.

On the other hand, the display enclosure case 11 is mounted with a rectangular-shaped LCD having a rectangular-shaped large-area image display region (not shown) on its surface side that faces the operation enclosure case 12 and also has a speaker (not shown) so that it may serve as a receiver-side enclosure. From a viewpoint of functionality and appearances in design, the display enclosure case 11 is mounted with a circular LCD (image display device) 15 so that a circular (non-rectangular) small-area image display region 16 may fit into a ring-shaped frame member 17 arrayed on the right surface side.

In the circular LCD15, a matrix of unit pixels 20 operative to display an image is arrayed on a circular pixel array substrate (color filter substrate and circuit-side substrate) 19 and configured to be covered over with a light-shielding layer 18 which is formed in such a manner as to overlap the ring-shaped frame member 17 (FIG. 1), thereby continuously rimming an outer edge 16a of the image display region 16 almost smoothly, as shown in FIG. 2. The LCD is made of the unit pixels 20, in each of which its sub-pixels 20r, 20g, and 20b are arrayed which turn the three primary colors of red (R), green (G), and blue (B) respectively, as shown in FIG. 3. The unit pixel 20 activates any liquid crystal that fills a gap between the color filter substrate and the circuit-side substrate for each of its sub-pixels 20r, 20g, and 20b, thereby color-displaying information input by manipulating the operation keys 14 and various kinds of information received via an antenna (not shown) by using backlight passing through the color filters in the pixel region. The sub-pixels 20r, 20g, and 20b each include a transparent electrode 22 that applies a signal voltage across the liquid crystal, a storage capacitor region 23 which holds the signal voltage, and a thin film transistor (TFT) 24 which is made of, for example, a silicon thin film and serves as an active element operative to switch the signal voltage on and off. The thin film transistor 24 switches the signal voltage on and off by using a scanning line 25 that electrically continues to a gate region 24g, which signal voltage applied across the liquid crystal is adapted to propagate from a signal line 26 which electrically continues to source/drain regions 24sd.

Each unit pixel 20 includes the sub-pixels 20r, 20g, and 20b, which are obtained by dividing the rectangular-shaped pixel into three strip-shaped portions; those sub-pixels have a black matrix (light-shielding portion) 27 (see FIGS. 4 and 5) formed between themselves in order to prevent color mixing between themselves as well as between the mutually neighboring unit pixels 20 and also to improve contrast. Also, in each unit pixel 20, its sub-pixels 20r, 20g, and 20b are assigned the same color filter transmission factor and also formed so that they may have the same area.

Now, getting back to FIG. 2, it is seen that in the circular LCD15, in accordance with its position on the outer edge 16a of the image display region 16 enclosed by the light-shielding layer 18, the end portion unit pixel 21 that adjoins a region borderline Lt between itself and this outer edge 16a of the light-shielding layer 18 is formed smaller in area than the interior inner unit pixel 20. Further, the end portion unit pixel 21 is formed in such a manner that its end portion sub-pixels 21r, 21g, and 21b may have a relative area proportion equal to the inner sub-pixels 20r, 20g, and 20b of the inner unit pixel 20 while at the same time keeping their individual rectangular shapes and also, in accordance with the position on the outer edge 16a, the array direction of the end portion sub-pixels 21r, 21g, and 21b is changed.

Specifically, in the circular LCD15, the end portion unit pixel 21 adjoining the outer edge 16a of the upper side or lower side of the image display region 16 in FIG. 2 has its end portion sub-pixels 21r, 21g, and 21b arrayed along with the outer edge 16a. Further, each end portion unit pixel 21 is formed smaller in area than the inner unit pixel 20 by shrinking the upper-side or lower-side portion of each of its end portion sub-pixels 21r, 21g, and 21b in such a manner that those sub-pixels may have the same area. For example, as shown in FIG. 4, in the case of left-side end portion unit pixel 21 that adjoins the upper-side outer edge 16a of the image display region 16, its end portion sub-pixels 21r, 21g, and 21b are laterally arrayed without changing a pixel width W from that of the inner unit pixel 20. Further, in order to form the region borderline Lt between the end portion unit pixels 21 and the light-shielding layer 18 into a continuously smooth arc (curve) shape as much as possible, the end portion unit pixels 21 are formed into a staircase shape by decreasing a pixel height H (by evenly shrinking the end portion sub-pixels 21r, 21g, and 21b) for each of those pixels 21 consecutively.

Further, the end portion unit pixel 21 adjoining the outer edge 16a of the right side or left side of the image display region 16 in FIG. 2 has its end portion sub-pixels 21r, 21g, and 21b arrayed in a vertical direction that orthogonally intersects with the array direction of the inner sub-pixels 20r, 20g, and 20b of the inner unit pixel 20. Furthermore, each end portion unit pixel 21 is formed smaller in area than the inner unit pixel 20 by shrinking the right-side or left-side portion of each of its end portion sub-pixels 21r, 21g, and 21b in such a manner that those sub-pixels may have the same area. For example, as shown in FIG. 5, in the case of upper-side end portion unit pixel 21 that adjoins the left-side outer edge 16a of the image display region 16, its end portion sub-pixels 21r, 21g, and 21b are disposed at the height of H and arrayed vertically formed in an angle of 90 degrees with respect to the arrangement of the inner sub-pixels 20r, 20g, and 20b of the inner unit pixel 20. Further, in order to form the region borderline Lt between the end portion unit pixels 21 and the light-shielding layer 18 into a continuously smooth arc shape as much as possible, those end portion unit pixels 21 are formed into a staircase shape by decreasing the pixel height H corresponding to the pixel width W of the inner unit pixels 20 for each of themselves consecutively.

That is, since the inner unit pixel 20 is formed square, the end portion unit pixel 21 can have its end portion sub-pixels 21r, 21g, and 21b arrayed in parallel with one of the vertical or horizontal sides of this square and the direction of the arrangement can be changed in accordance with the position on the outer edge 16a of the image display region 16. In the present exemplary embodiment, the end portion unit pixel 21 has its end portion sub-pixels 21r, 21g, and 21b arrayed in such a manner that the direction in which the region borderline Lt extends between itself and its neighboring light-shielding layer 18 may be nearly in parallel with the direction in which the black matrix (pixel borderline) 27 extends between the inner unit pixels 20 which are adjacent to each other on the opposite side. In other words, the end portion sub-pixels 21r, 21g, and 21b of each end portion unit pixel 21 are formed and arrayed in such a manner that it may extend perpendicularly to both of the region borderline Lt between itself and the neighboring light-shielding layer 18 and the black matrix 27 between the inner unit pixels 20 which are adjacent to each other on the opposite side. Accordingly, the end portion sub-pixels 21r, 21g, and 21b of each end portion unit pixel 21 can be arrayed so that they may extend perpendicularly to a direction in which a gap extends between the light-shielding layer 18 and the inner unit pixels 20, so that they can be arrayed along the light-shielding layer 18.

As can be seen from the above, in the present embodiment, the circular LCD15 is capable of avoiding the end portion sub-pixels 21r, 21g, and 21b of the end portion unit pixel 21 that adjoins the outer edge 16a of the image display region 16 from being covered with the light-shielding layer 18 unevenly. Therefore, like the inner unit pixel 20, in the end portion unit pixel 21 also, the colors can appear in an equal area, thereby maintaining color balance at the outer edge 16a of the image display region 16.

Second Exemplary Embodiment

Next, a description will be given of the second exemplary embodiment of the present invention.

Figure 6:
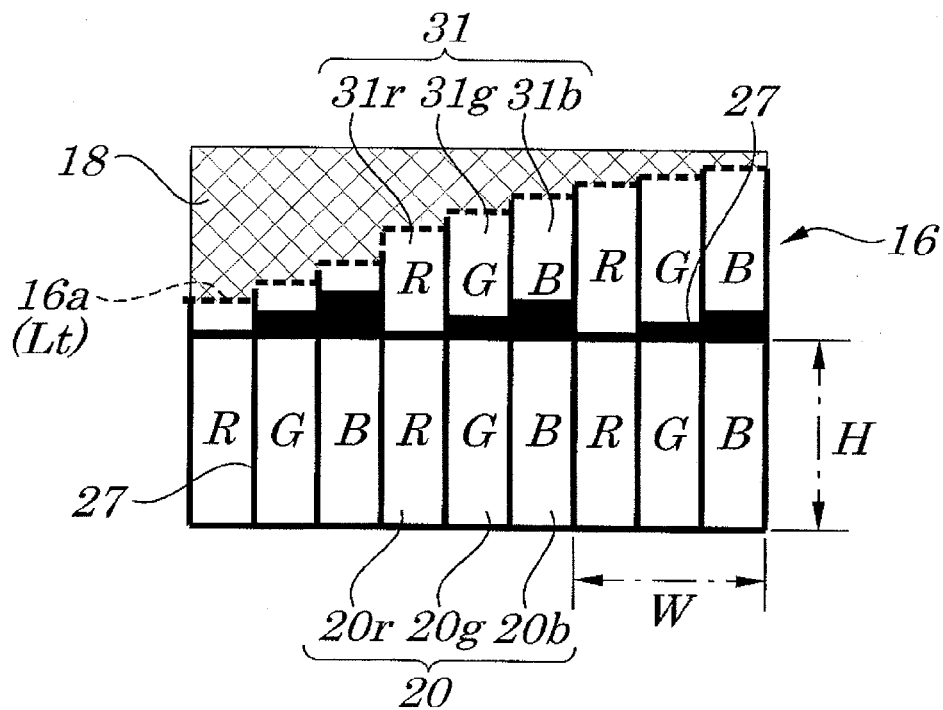
FIG. 6 is a partially enlarged plan view for showing one enlarged portion of a pixel arrangement around one end portion of an image display region of an image display device according to the second exemplary embodiment of the present invention.
Figure 7:
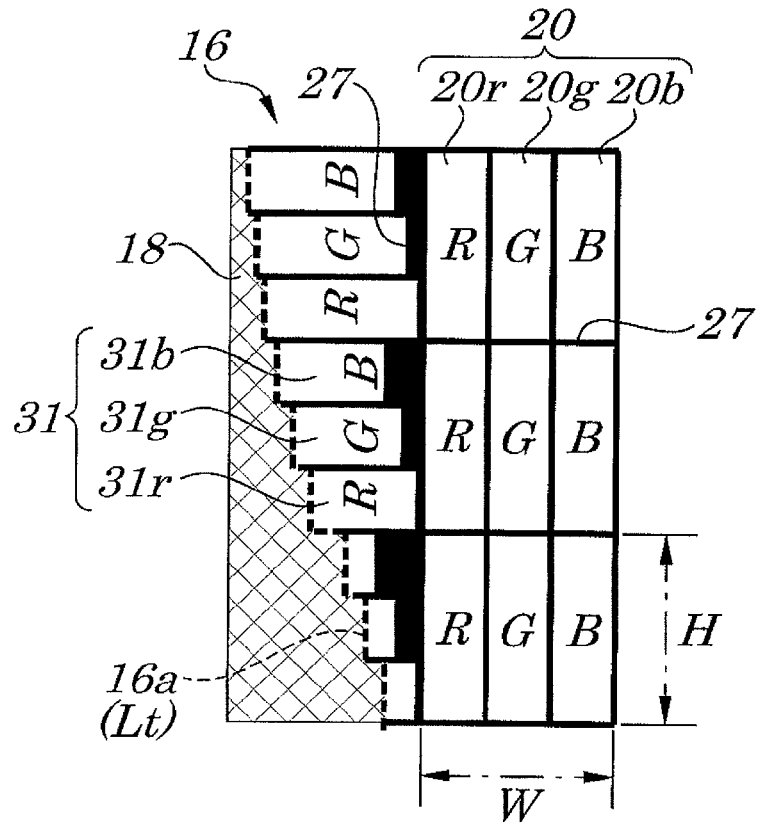
FIG. 7 is a partially enlarged plan view for showing a pixel arrangement around another end portion of the image display region of the image display device.

FIG. 6 is a partially enlarged plan view for showing one enlarged portion of a pixel arrangement around one end portion of an image display region of an image display device according to the second exemplary embodiment of the present invention and FIG. 7 is a partially enlarged plan view for showing a pixel arrangement around another end portion of the image display region of the image display device. It is to be noted that the present exemplary embodiment has components similar to those of the above exemplary embodiment, so that identical reference numerals are given to the identical components, and description will be given of dissimilar components (which holds true also with the other exemplary embodiments described hereinafter).

Like the above first exemplary embodiment, in a circular LCD15 of a cellular phone (electronic device) of the present exemplary embodiment, an end portion unit pixel 31 adjoining an outer edge 16a of the upper side or lower side of an image display region 16 in FIG. 6 has its end portion sub-pixels 31r, 31g, and 31b arrayed in the same lateral direction as the array direction of the inner sub-pixels 20r, 20g, and 20b of an inner unit pixel 20. Further, each end portion unit pixel 31 is formed smaller in area than the inner unit pixel 20 by shrinking the upper-side or lower-side portion of each of its end portion sub-pixels 31r, 31g, and 31b in such a manner that those sub-pixels may have the same area. On the other hand, also in the case of the end portion unit pixel 31 adjoining the left-side or right-side (not shown) outer edge 16a of the image display region 16 in FIG. 6, its end portion sub-pixels 31r, 31g, and 31b are arrayed in a vertical direction that orthogonally intersects with the array direction of the inner sub-pixels 20r, 20g, and 20b of the inner unit pixel 20. The end portion unit pixel 31 is formed smaller in area than the inner unit pixel 20 by shrinking the right-side or left-side portion of each of the end portion sub-pixels 31r, 31g, and 31b of each of those end portion unit pixels 31 in such a manner that those sub-pixels may have the same area.

Further, in the present embodiment, in order to form a region borderline Lt between the image display region 16 and a light-shielding layer 18 into more smoothly continuously arc shape, a width (pixel border width) is changed of a black matrix 27 between the end portion unit pixel 31 and the inner unit pixel 20 that neighbors it on the opposite side of the outer edge 16a. That is, in this image display region 16, the width of the black matrix 27 extending nearly in parallel with the outer edge 16a is changed in such a manner that the areas of the respective end portion sub-pixels 31r, 31g, and 31b may be kept equal to each other.

For example, both in the case of the left-side end portion unit pixel 31 that adjoins the upper-side outer edge 16a of the image display region 16 as shown in FIG. 6 and the case of the left-side end portion unit pixel 31 that adjoins the lower-side outer edge 16a of the image display region 16 as shown in FIG. 7, the width of the neighboring black matrix 27 is changed for each of the end portion sub-pixels 31r, 31g, and 31b, thereby forming the borderline into a more finely continual staircase shape.

As can be seen from the above, in the present exemplary embodiment, besides the operative effects of the first exemplary embodiment, in the circular LCD15, the outer edge 16a of the image display region 16 can be formed into a more smoothly continuous arc shape by changing it into a staircase shape for each of the end portion sub-pixels 31r, 31g, and 31b of the end portion unit pixel 31.

It is to be noted here that the related technologies described in Patent Document 4 would increase the width of the black matrix that intersects with the outer edge of the image display region, so that the thickened black matrix may be recognized as a portion of the outer edge, thereby damaging the smoothness. In contrast, the present exemplary embodiment would change the width of the black matrix 27 nearly in parallel with the outer edge 16a of the image display region 16, so that the black matrix 27, even if thickened, will not be taken for the outer edge 16a.

Third Exemplary Embodiment

Next, a description will be given of the third exemplary embodiment of the present invention.

Figure 8:
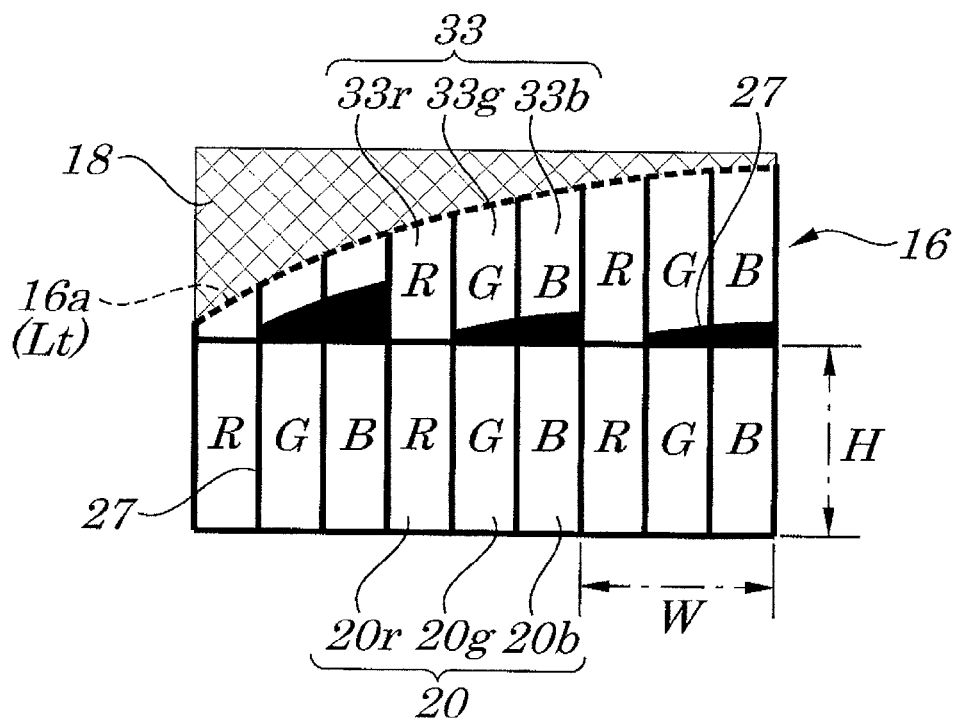
FIG. 8 is a partially enlarged plan view for showing one enlarged portion of a pixel arrangement around one end portion of an image display region of an image display device according to a third exemplary embodiment of the present invention.
Figure 9:
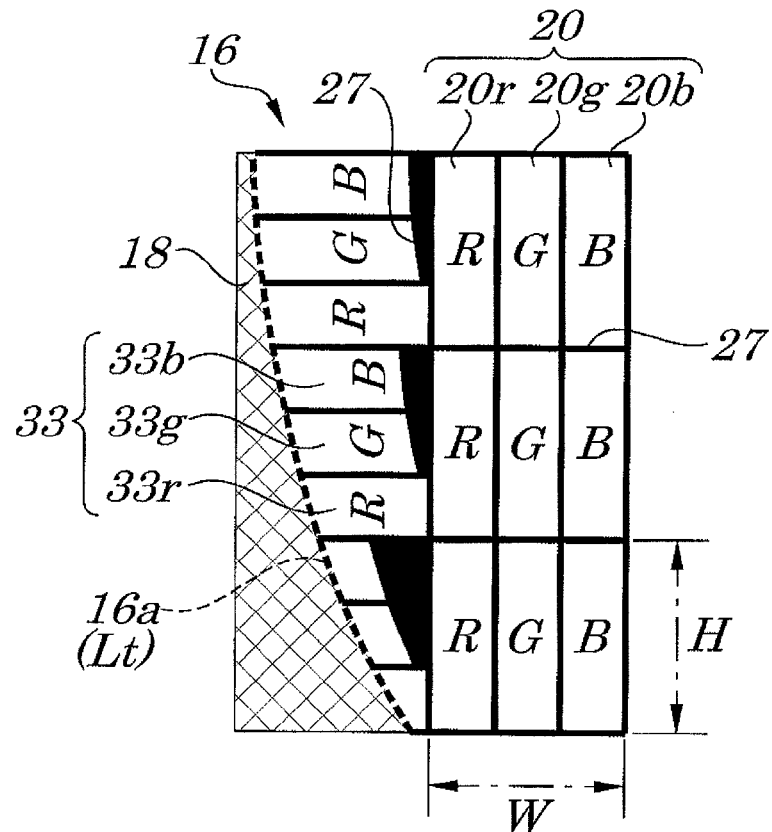
FIG. 9 is a partially enlarged plan view for showing a pixel arrangement around another end portion of the image display region of the image display device.

FIG. 8 is a partially enlarged plan view for showing one enlarged portion of a pixel arrangement around one end portion of an image display region of an image display device according to the third exemplary embodiment of the present invention and FIG. 9 is a partially enlarged plan view for showing a pixel arrangement around another end portion of the image display region of the image display device.

Like the above second exemplary embodiment, in a circular LCD15 of a cellular phone (electronic device) of the present exemplary embodiment, an end portion unit pixel 33 adjoining an outer edge 16a of the upper side or the lower side (not shown) of an image display region 16 in FIG. 8 has its end portion sub-pixels 33r, 33g, and 33b arrayed in the same lateral direction as the array direction of inner sub-pixels 20r, 20g, and 20b of an inner unit pixel 20. Further, the end portion unit pixel 33 adjoining an outer edge 16a of the left side or the right side (not shown) of the image display region 16 in FIG. 8 also has its end portion sub-pixels 33r, 33g, and 33b arrayed in a vertical direction that orthogonally intersects with the array direction of the inner sub-pixels 20r, 20g, and 20b of the inner unit pixel 20.

Further, in the present exemplary embodiment, for example, as shown in FIGS. 8 and 9, the end portion sub-pixels 33r, 33g, and 33b of the end portion unit pixel 33 are respectively formed non-rectangular on the side of an outer edge 16a so that a region borderline Lt between the image display region 16 and a light-shielding layer 18 maybe formed into a completely smoothly continuous arc. That is, the end portion sub-pixels 33r, 33g, and 33b are arrayed in such a posture as to extend not in a direction that orthogonally intersects with the outer edge 16a but in a direction that orthogonally intersects with a black matrix 27 between themselves and the inner unit pixels 20 on the opposite side.

On the other hand, on the opposite side of the outer edge 16a in the image display region 16, the width and the shape of the black matrix 27 between the end portion unit pixel 33 and the neighboring inner unit pixel 20 are changed in such a manner as to nearly match the region borderline Lt, thereby giving the same small area to the end portion sub-pixels 33r, 33g, and 33b of each of the end portion unit pixels.

As can be seen from the above, in the present exemplary embodiment, besides the operative effects of the second exemplary embodiment, in the circular LCD15, the outer edge 16a of the image display region 16 can be formed into a smoothly continuous arc shape by forming the end portion sub-pixels 33r, 33g, and 33b of the end portion unit pixel 33 non-rectangular.

Fourth Exemplary Embodiment

Next, a description will be given of the fourth exemplary embodiment of the present invention.

Figure 10:
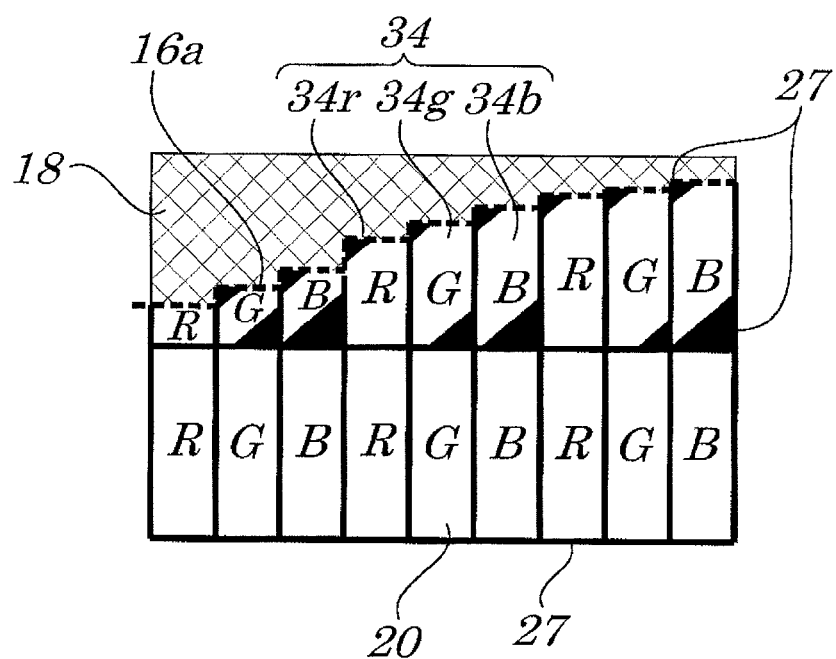
FIG. 10 is a partially enlarged plan view for showing one enlarged portion of a pixel arrangement of an image display device according to a fourth exemplary embodiment of the present invention.

FIG. 10 is a partially enlarged plan view for showing a pixel arrangement of an image display device according to the fourth exemplary embodiment of the present invention.

Like the above second exemplary embodiment, in a circular LCD15 of a cellular phone (electronic device) of the present exemplary embodiment, an end portion unit pixel 34 adjoining an outer edge 16*a* of the upper side or lower side of an image display region 16 in FIG. 10 has its end portion sub-pixels 34*r*, 34*g*, and 34*b* arrayed in the same lateral direction as the array direction of the inner sub-pixels 20*r*, 20*g*, and 20*b* of an inner unit pixel 20. Further, the end portion unit pixel 34 adjoining the outer edge 16*a* of the right side (not shown) or the left side of the image display region 16 also has its end portion sub-pixels 34*r*, 34*g*, and 34*b* arrayed in a vertical direction that orthogonally intersects with the array direction of the inner sub-pixels 20*r*, 20*g*, and 20*b* of the inner unit pixel 20.

Further, in the present exemplary embodiment, for example, as shown in FIGS. 8 and 9, the end portion sub-pixels 34*r*, 34*g*, and 34*b* of the end portion unit pixel 34 are respectively formed non-rectangular on the side of the outer edge 16*a* so that a region borderline Lt between the image display region 16 and a light-shielding layer 18 of may be at an oblique angle of 45 degrees with respect to the horizontal angle of 0 degrees and the perpendicular angle of 90 degrees respectively.

On the other hand, on the opposite side of the outer edge 16*a* in the image display region 16, the width and the shape of a black matrix 27 between the end portion unit pixel 34 and the neighboring inner unit pixel 20 are changed in such a manner as to nearly match the region borderline Lt at the angle of 45 degrees with respect to the angle of 0 degree and the angle of 90 degrees respectively, thereby giving the same small area to the end portion sub-pixels 33*r*, 33*g*, and 33*b* of each of the end portion unit pixels.

As can be seen from the above, in contrast to the third embodiment in which the region borderline Lt is set to an arbitrary angle, in the present embodiment, it is limited to three angles of 0 degree, 90 degrees, and 45 degrees. If the border may take on an arbitrary angle, the angle tolerance management will be complicated during the manufacturing of the LCDs. Therefore, the present embodiment enables forming the outer edge 16*a* of the image display region 16 into a smooth arc shape while mitigating the tolerance management in the manufacturing processes.

It is to be noted that although the restrictive angle may be selected arbitrarily, the use of 45 degrees has the following merits. As shown in FIGS. 6 and 7, the angle is limited to 0 degree and 90 degrees in the first embodiment. Therefore, portions of the outer edge 16*a* of the circular display screen in FIG. 2 that have an angle in the vicinity of the horizontal angle or the perpendicular angle can be rendered smooth but those having an angle in the vicinity of the oblique angle of 45 degrees, at which the horizontal state is switched to the perpendicular state, cannot be rendered smooth. In contrast to it, the present embodiment in which the angle of 45 degrees is added to the angle options of the region borderline Lt will eliminate those disadvantages, further improving the smoothness of the outer edge 16*a*.

Fifth Exemplary Embodiment

Next, a description will be given of the fifth exemplary embodiment of the present invention.

Figure 11:
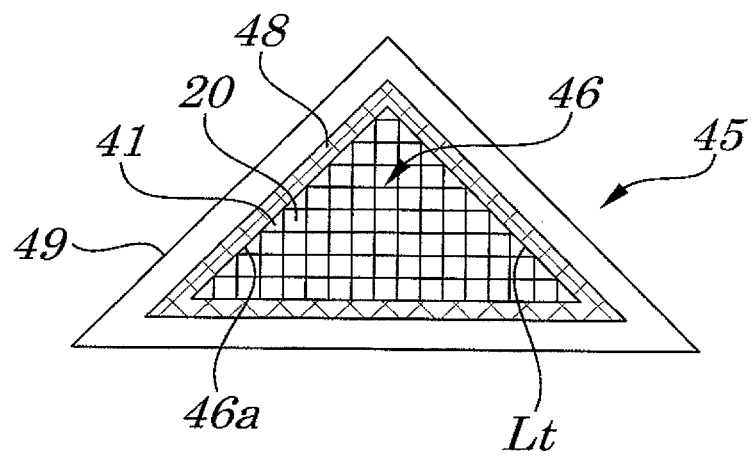
FIG. 11 is a plan view for showing an image display region of an image display device according to a fifth exemplary embodiment.
Figure 12:
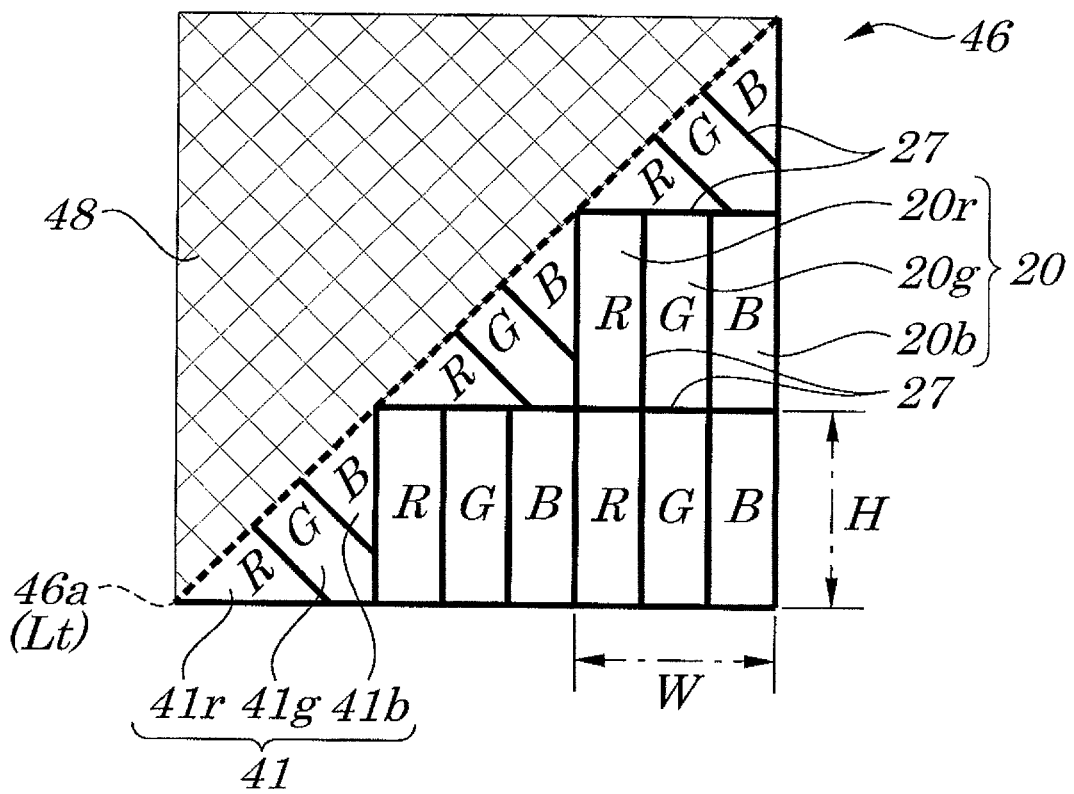
FIG. 12 is a partially enlarged plan view for showing a pixel arrangement of the image display device.
Figure 13:
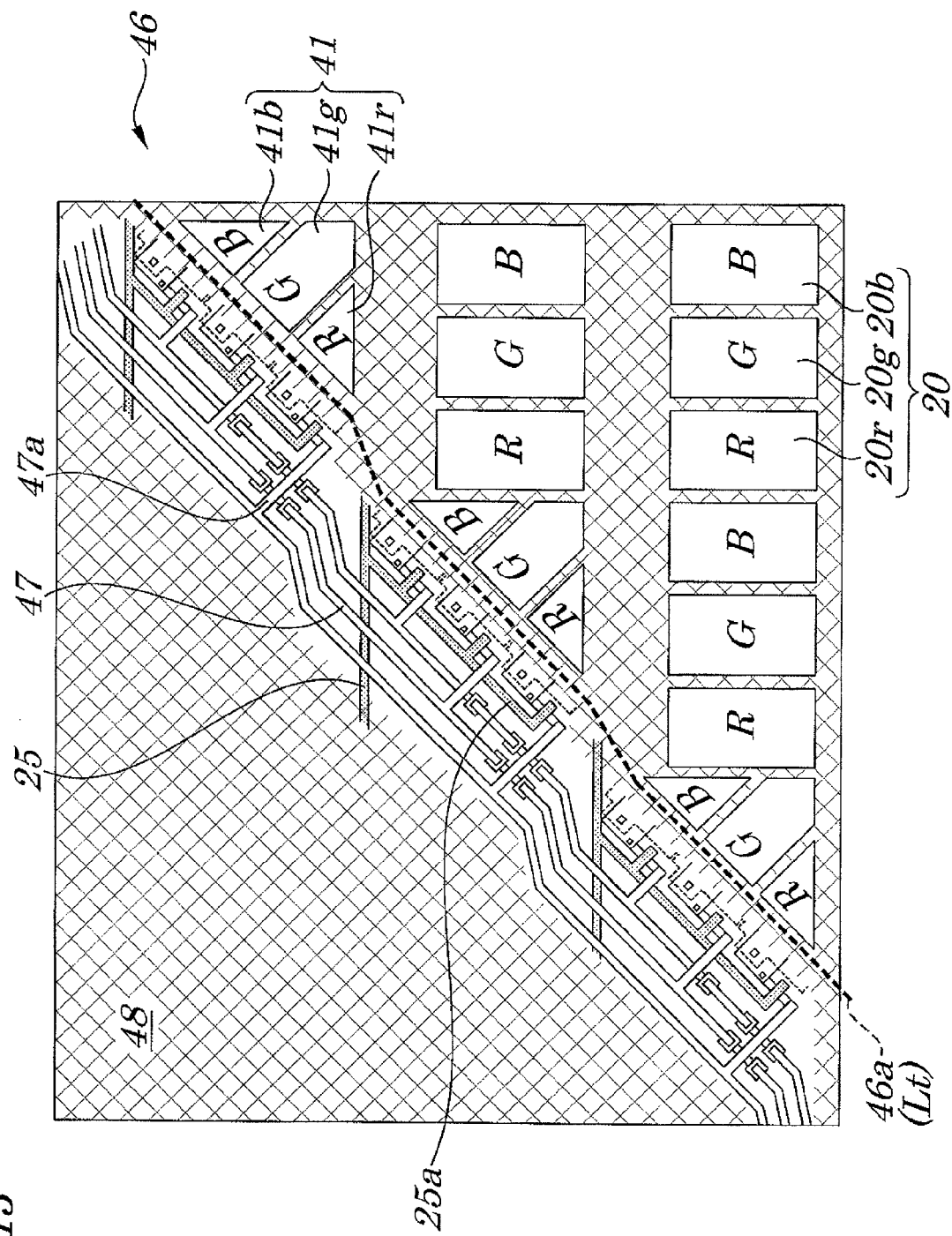
FIG. 13 is a partially enlarged plan view for showing a layout of a circuit region on a color filter substrate of the image display device.
Figure 14:
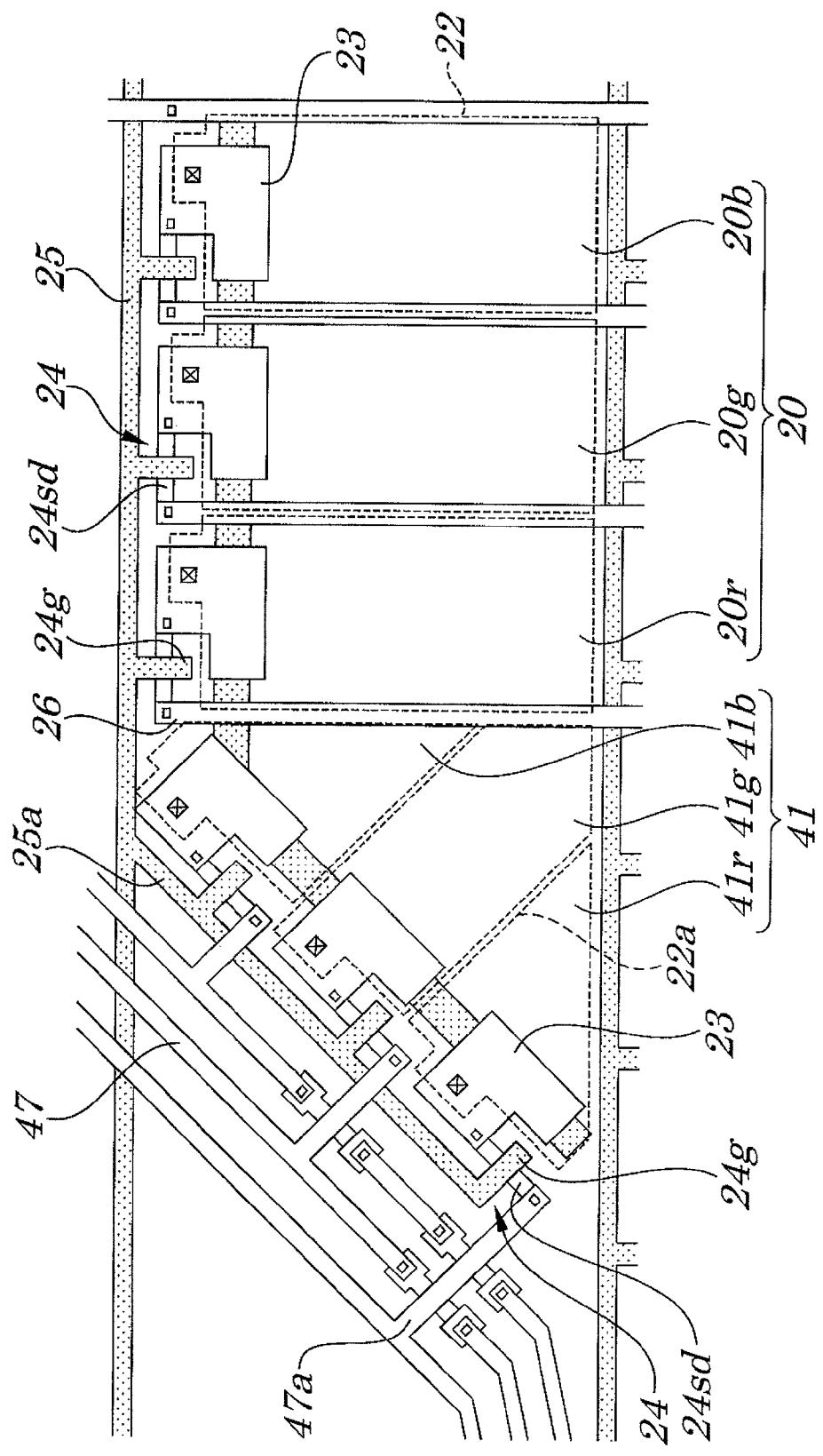
FIG. 14 is a partially enlarged plan view for showing a layout of the circuit region and a pixel region on the color filter substrate of the image display device.

FIG. 11 is a plan view for showing an image display region of an image display device according to the fifth exemplary embodiment, FIG. 12 is a partially enlarged plan view for showing a pixel arrangement of the image display device, FIG. 13 is a partially enlarged plan view for showing a layout of a circuit region on a pixel array substrate (color filter substrate and circuit-side substrate) of the image display device, and FIG. 14 is a partially enlarged plan view for showing a layout of the circuit region and a pixel region on the circuit-side substrate of the image display device.

From a viewpoint of functionality and appearances in design, a display enclosure case 11 of a cellular phone (electronic device) of the present exemplary embodiment is mounted with a triangular LCD (image display device) 45 so that a triangular (non-rectangular) small-area image display region 46 may fit into a triangular frame member (not shown) disposed on the right surface side.

As shown in FIG. 11, in the triangular LCD45, a matrix of unit pixels 20 operative to display an image is disposed on a triangular pixel array substrate (color filter substrate and circuit-side substrate) 49 and configured to be covered over with a light-shielding layer 48 which is formed in such a manner as to overlap the above triangular frame member, thereby rimming an outer edge 46*a* of the image display region 46.

In the triangular LCD45, in accordance with its position on the outer edge 46*a* of the image display region 46 enclosed by the light-shielding layer 48, the end portion unit pixel 41 that adjoins a region borderline Lt between this outer edge 46*a* and the light-shielding layer 48 is formed smaller in area than the interior inner unit pixel 20. Further, as shown in FIG. 12, by adjusting the bottom and the height of the pixels R and B as well as the width etc. of the pixel G, the end portion sub-pixels 41*r*, 41*g*, and 41*b* are formed in such a manner as to have a relative area proportion equal to the inner sub-pixels 20*r*, 20*g*, and 20*b* of the inner unit pixel 20 and also, in accordance with the position on the outer edge 46*a*, the array direction of the end portion sub-pixels 41*r*, 41*g*, and 41*b* is changed.

Specifically, in the triangular LCD15, the end portion unit pixel 41 contacting (or adjoining) the outer edge 46*a* that corresponds to an oblique side of the triangular image display region 46 is formed smaller in area than the inner unit pixel 20 by adjusting the array directional width in such a manner that its end portion sub-pixels 41*r*, 41*g*, and 41*b* may be in parallel with the outer edge 46*a* and also that for each of the end portion unit pixels 41, the end portion sub-pixels 41*r*, 41*g*, and 41*b* may have the same area. For example, as shown in FIG. 12, in the end portion unit pixels 21 that contacts (or adjoining) the outer edge 46*a* which corresponds to the left-side oblique side of the image display region 46, their end portion sub-pixels 41*r*, 41*g*, and 41*b* are respectively formed into similar figures employing the pixel width W and the pixel height H of the inner unit pixel 20 as their oblique side and arrayed along their own bottom side. It is to be noted that since the end portion unit pixels 41 contact the outer edge 46*a* that corresponds to the oblique side of the triangle of the image display region 46 and also contact the inner unit pixels 20, those pixels 41 may be symmetrical with each other along this oblique side.

That is, the end portion unit pixel 41 is formed in shape in such a manner as to have its included angle formed between each of the mutually perpendicular two sides of a black matrix (pixel borderline) 27 between the mutually neighboring inner unit pixels 20 and the region borderline Lt between itself and the light-shielding layer 48 of the neighboring outer edge 46*a*, so that it has its end portion sub-pixels 41*r*, 41*g*, and 41*b* arrayed along an extension of this region borderline Lt. Therefore, the end portion unit pixel 41 has its end portion sub-pixels 41*r*, 41*g*, and 41*b* arrayed in a direction in which the gap between the light-shielding layer 48 and the inner unit pixel 20 extends, in other words, a direction along the light-shielding layer 48 in such a posture that those end portion sub-pixels 41*r*, 41*g*, and 41*b* may extend in a direction that orthogonally intersects with the outer edge 46a (region borderline Lt) of the image display region 46.

It is to be noted that in the end portion unit pixel 41, its end portion sub-pixels 41r, 41g, and 41b are shrunk in area and arrayed (arranged) in a direction different from that of the inner sub-pixels 20r, 20g, and 20b of the inner unit pixel 20. Accordingly, as shown in FIGS. 13 and 14, transparent electrodes 22a between the end portion sub-pixels 41r, 41g, and 41b are formed in such a manner as to match their shapes respectively. Further, an additional signal line 47 configured to cause the end portion sub-pixels 41r, 41g, and 41b to function is added into a region in which the light-shielding layer 48 is formed so that its branch line 47a may electrically continue to a gate region 24g of a thin film transistor 24, while on the other hand, a branch scanning line 25a that branches off from a scanning line 25 electrically continues to a source/drain region 24sd of the thin film transistor 24 so that a signal voltage may be turned on/off and applied across the liquid crystal. Therefore, the end portion unit pixels 41 cause their sub-pixels to function by utilizing the scanning lines 25 for the inner unit pixels 20 in common without wiring around the scanning line in particular.

In such a manner, in the present exemplary embodiment, due to almost the same operative effects of the above exemplary embodiment, the triangular LCD 45 is capable of avoiding the end portion sub-pixels 41r, 41g, and 41b of the end portion unit pixel 41 that adjoins the outer edge 46a of the image display region 46 on the side of its oblique side from being covered with the light-shielding layer 48 unevenly in area. Further, similar to the inner unit pixel 20, the end portion unit pixel 41 is capable of providing equal color development in the three primary colors, thereby maintaining color balance at the outer edge 46a of the image display region 46. Furthermore, the end portion sub-pixels 41r, 41g, and 41b are arrayed in spacing longer than the pixel width W or height H of the inner unit pixel 20, to eliminate the necessity of miniaturizing a storage capacity region 23 or the thin film transistor (TFT) 24 etc., thereby enabling easy design in formation thereof.

It is to be noted here that the above Patent Document 5 describes in its paragraph "0020" that a decrease in area of the sub-pixels increases the number of the scanning lines and, therefore, makes wiring difficult to design. In contrast to it, in the present exemplary embodiment, wiring is easy because the end portion unit pixels 41 are caused to function by the branch scanning line 25a that branches off from the scanning line 25 of the inner unit pixels 20; at the same time, a portion where branching occurs is covered over by the light-shielding layer 48 so that the disposition of the inner unit pixels 20 may not be disturbed, thereby avoiding a region necessary for their wiring from being becoming larger uselessly.

Further, although the present exemplary embodiment has been described with reference to one example where the branch scanning line 25a would be wired over the end portion sub-pixels 41r, 41g, and 41b of the triangular end portion unit pixel 41 so that they might function, it may be wired similarly over the end portion sub-pixels in the above exemplary embodiment, in which case the wiring can be compact similarly.

Further, although the present exemplary embodiment has been described with reference to one example where the end portion unit pixel 41 would be triangular, the end portion unit pixel may be similarly configured in such a manner that an outline thereof making up the outer edge of an image display region has the arc of a circle in shape, which is approximately similar to the oblique side similar as in the case of the above exemplary embodiment. In this case also, almost the same operative effects can be obtained.

Sixth Exemplary Embodiment

Next, a description will be given of the sixth exemplary embodiment of the present invention.

Figure 15:
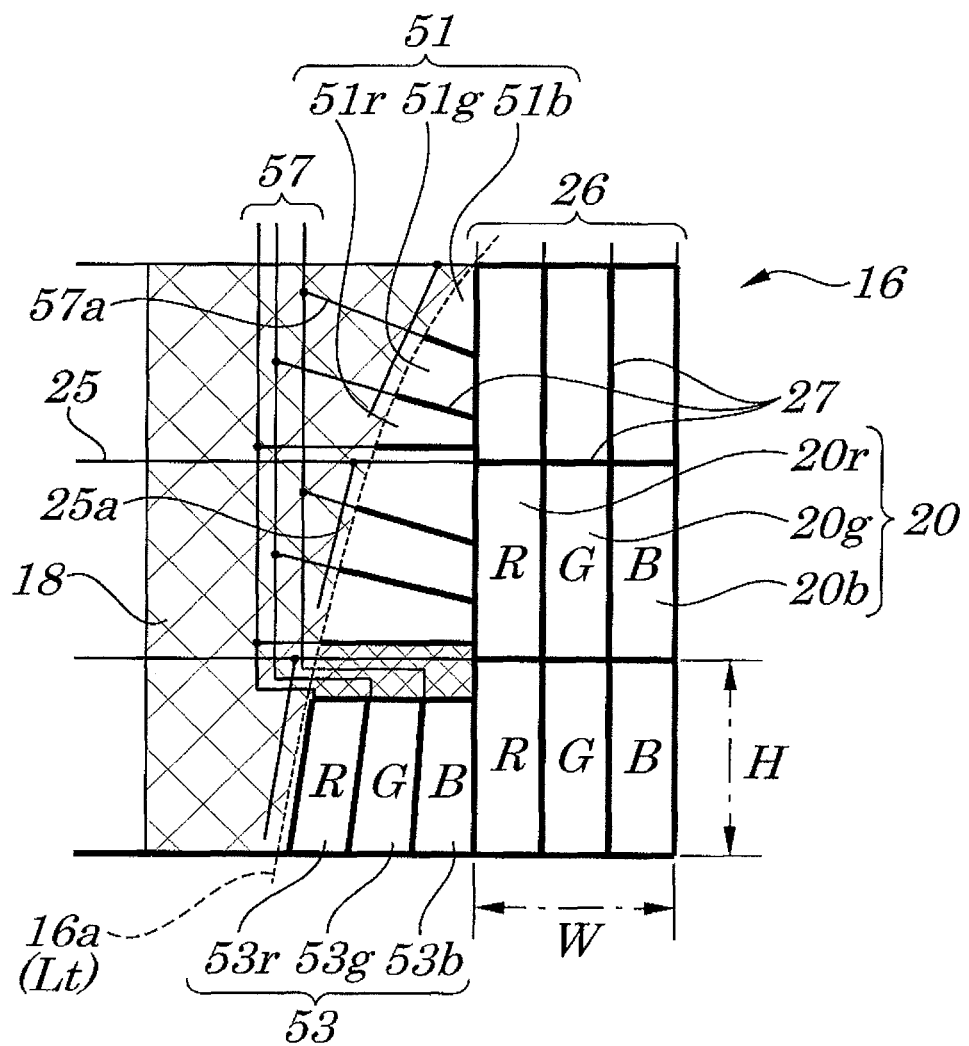
FIG. 15 is a partially enlarged plan view for showing one enlarged portion of a pixel arrangement of an image display device according to a sixth exemplary embodiment of the present invention.

FIG. 15 is a partially enlarged plan view for showing one enlarged portion of a pixel arrangement of an image display device according to the sixth exemplary embodiment of the present invention.

Similar to the above third exemplary embodiment (FIGS. 8 and 9), in a circular LCD 15 of a cellular phone (electronic device) of the present exemplary embodiment, an end portion unit pixel 51 or 53 is disposed which is formed smaller in area than an inner unit pixel 20 in accordance with spacing between an outer edge 16a of an image display region 16 and the adjoining inner unit pixel 20 so that a region borderline Lt between the image display region 16 and a light-shielding layer 18 may not be like a staircase but be like an arc that continues smoothly.

Specifically, in the end portion unit pixel 51, if there is no spacing large enough to arrange and dispose its end portion sub-pixels 51r, 51g, and 51b in the same direction as that of the inner unit pixels 20, those end portion sub-pixels 51r, 51g, and 51b are arrayed in a direction along the light-shielding layer 18 in such a posture that they may extend in a direction that orthogonally intersects with the outer edge 16a (region borderline Lt) of the image display region 16 while being equal in area as in the above fifth exemplary embodiment. In such a case, like the above fifth exemplary embodiment (FIG. 14), the later-described branch signal line 57a that branches off from a signal line 57 used for end portion sub-pixels 53r, 53g, and 53b is configured to electrically continue to a source/drain region 24sd (FIG. 14) of a thin film transistor 24 while on the other hand a branch scanning line 25a that branches off from a scanning line 25 is configured to electrically continue to a gate region 24g (FIG. 14) of the thin film transistor 24, so that a signal voltage may be turned on/off and applied across the liquid crystal. Therefore, in the end portion unit pixels 51, those sub-pixels can function by utilizing the scanning lines 25 for the inner unit pixels 20 and the signal line 57 for the end portion unit pixels 53 in common without wiring around the signal line together with the scanning lines as well in particular.

On the other hand, in the end portion unit pixel 53, if there is spacing large enough to arrayed its end portion sub-pixels 53r, 53g, and 53b in the same direction as that of the inner unit pixels 20, those end portion sub-pixels 53r, 53g, and 53b are given the same area and arrayed in such a manner as to join the light-shielding layer 18 in a posture in which they would extend in a direction that is nearly in parallel with the outer edge 16a (region borderline Lt) of the image display region 16. In such a case, the signal line 57 is configured to electrically continue to each of the source/drain region 24sd (FIG. 14) of the thin film transistor 24 via a border region between themselves and the end portion unit pixel 51 while on the other hand the branch scanning line 25a is configured to electrically continue to the gate region 24g (FIG. 14) of the thin film transistor 24 so that the signal voltage may be turned on/off and applied across the liquid crystal. Therefore, similar to the inner unit pixels 20, in the end portion unit pixels 53 also, their sub-pixels can be caused to function by forming the scanning lines and the signal line that should be wired originally, without wiring around the scanning lines and the signal line in particular.

That is, like inner unit pixels 20, the end portion unit pixels 51 and 53 are positioned on the same column so that they may function based on the signal line 57 common to them; accordingly, in contrast to the above fourth exemplary embodiment, the special additional signal line 47 is not necessary even in the case of the end portion sub-pixels 51r, 51g, and 51b, which are arrayed in a posture that is inclined in a direction different from that of the inner sub-pixels 20r, 20g, and 20b of the inner unit pixel 20.

As can be seen from the above, in the present exemplary embodiment, besides the operative effects of the first through fifth exemplary embodiments, in the circular LCD15, it is possible to arrange such end portion unit pixels 51 and 53 as to match spacing between the inner unit pixels 20 and the outer edge 16a of the image display region 16 and also wire their circuits easily and simply.

Seventh Exemplary Embodiment

Next, a description will be given of the seventh exemplary embodiment of the present invention.

Figure 16:
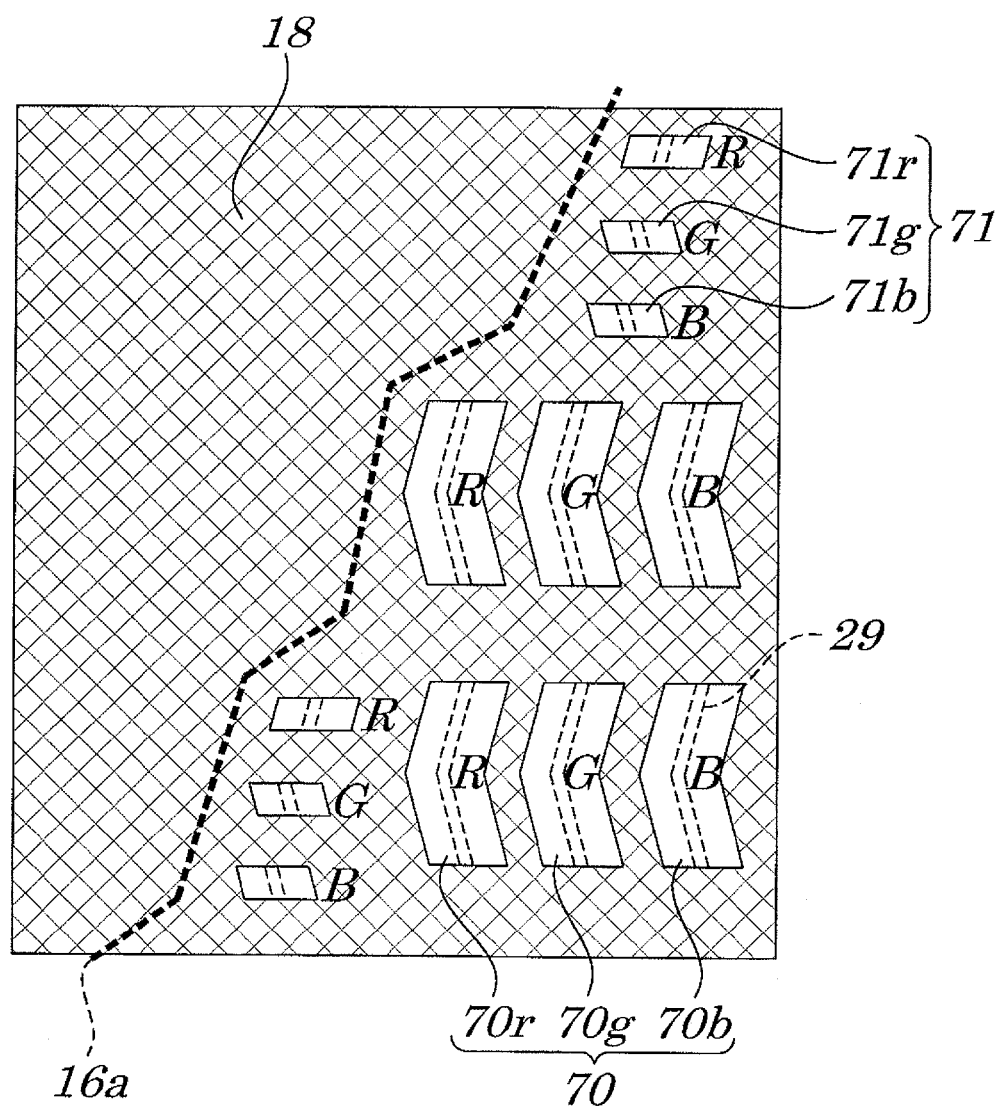
FIG. 16 is a partially enlarged plan view for showing a layout of a circuit region on a pixel array substrate (color filter substrate and a circuit side substrate) of an image display device according a seventh exemplary embodiment of the present invention.
Figure 17:
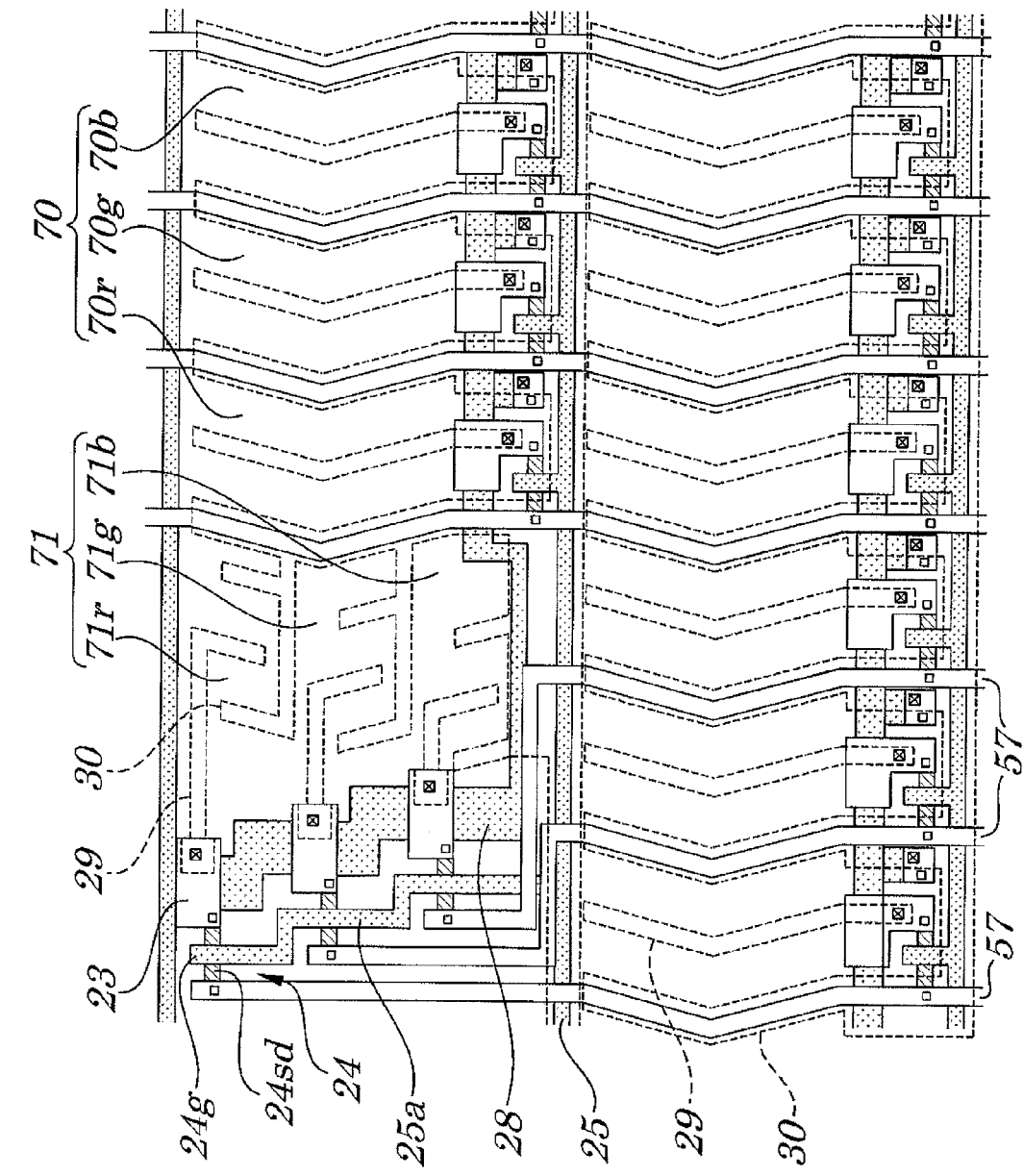
FIG. 17 is a partially enlarged plan view for showing a layout of the circuit region and a pixel region on the circuit side substrate of the image display device.

FIG. 16 is a partially enlarged plan view for showing a layout of a circuit region on a pixel array substrate (color filter substrate and a circuit side substrate) of an image display device according to the seventh exemplary embodiment of the present invention and FIG. 17 is a partially enlarged plan view for showing a layout of the circuit region and a pixel region on the circuit-side substrate of the image display.

The pixel array substrate of the present exemplary embodiment is of an in-plane switching (IPS) type liquid-crystal pixel array and features the shape of inner unit pixels 70, that is, its sub-pixels 70r, 70g, and 70b that turn red (R), green (G), and blue (B) respectively are not rectangular but take on a dogleg shape with a bent portion.

Further, in accordance with its position on an outer edge 16a of an image display region 16 enclosed by a light-shielding layer 18, an end portion unit pixel 71 that adjoins a region borderline Lt between this outer edge 16a and the light-shielding layer 18 is formed smaller in area than the interior inner unit pixel 70. Further, the end portion sub-pixels 71r, 71g, and 71b are formed in such a manner as to have a relative area proportion equal to the inner sub-pixels 70r, 70g, and 70b of the inner unit pixel 70 and also, in accordance with the position on the outer edge 16a, the array direction of the end portion sub-pixels 71r, 71g, and 71b is changed. Specifically, in the case of the end portion unit pixel 71 that joins the outer edge 16a of the image display region 16, its sub-pixels 71r, 71g, and 71b are arrayed in parallel with this outer edge 16a.

It is to be noted that in the in-plane switching type liquid crystal pixel array shown in FIG. 17, a pixel electrode 29 of the non-rectangular inner unit pixel 70 is made up of a dogleg transparent electrode, while a common electrode 30 made up of a dogleg transparent electrode similar to the pixel electrode 29 is disposed to a position that is translationally shifted from that of the pixel electrode 29. That is, the transparent pixel electrode 29 and the transparent common electrode 30 are nearly-equally spaced in parallel with each other in the same layer. Accordingly, the liquid crystal will be driven by an electric field in parallel with the surface of the substrate that is generated by a difference in potential between the transparent pixel electrode 29 and the transparent common electrode 30, more specifically, by a right-and-left horizontal electric field.

The transparent pixel electrode 29 and the transparent common electrode 30 contained in the end portion unit pixel 71 shown in the same FIG. 17 are translationally shifted in a direction different from that of that of the inner unit pixel 70. That is, the transparent pixel electrode 29 extends from a thin film transistor 24 and a storage capacitor 23 horizontally in FIG. 17, while on the other hand the transparent common electrode 30 and the neighboring color pixel electrode are translationally shifted vertically. On the other hand, the transparent pixel electrode 29 and the transparent common electrode 30 each have a branch portion. Those electrodes are formed into such a shape that a direction of an electric field in parallel with the substrate surface that occurs between a pair of the transparent pixel electrode 29 and the transparent common electrode 30 may be nearly equal to that of an electric field occurring in the inner unit pixel 70.

In the present exemplary embodiment, the color-specific sub-pixel array direction is different between the transparent pixel electrode 29 and the transparent common electrode 30, but those electrodes 29 and 30 generate a nearly equal horizontal electric field. Since they have the same electric field direction, in both of the inner unit pixel 70 and the end portion unit pixel 71, the liquid crystal functions in much the same way, turning the same colors.

In such a manner, in the present exemplary embodiment, the LCD is capable of avoiding the end portion sub-pixels 71r, 71g, and 71b of the end portion unit pixel 71 that adjoins the outer edge 16a of the image display region 16 from being unevenly covered with the light-shielding layer 18. Therefore, like the inner unit pixel 70, even in the end portion unit pixel 71, the sub-pixels can turn the respective colors in an equal area. Furthermore, since the transparent pixel electrode 29 and the transparent common electrode 30 generate a nearly equal horizontal electric field both in the inner unit pixel 70 and the end portion unit pixel 71, color balance can be maintained at the outer edge 16a of the image display region 16.

Further, although the present exemplary embodiment has employed the dogleg-shaped transparent common electrode 30 of the inner unit pixel 70, the present invention is not limited to it; for example, the shape may be straight. In this case also, almost the same operative effects can be obtained.

Eighth Exemplary Embodiment

Next, a description will be given of the eighth exemplary embodiment of the present invention.

Figure 18:
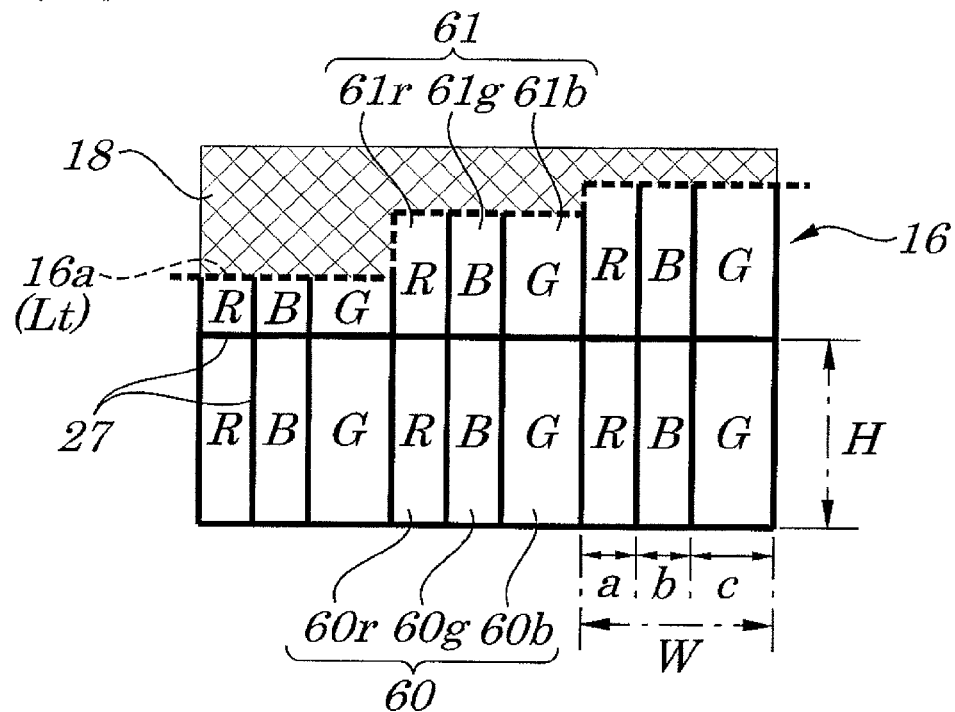
FIG. 18 is a partially enlarged plan view for showing one enlarged portion of a pixel arrangement around one end portion of an image display region of an image display device according to an eighth exemplary embodiment of the present invention.
Figure 19:
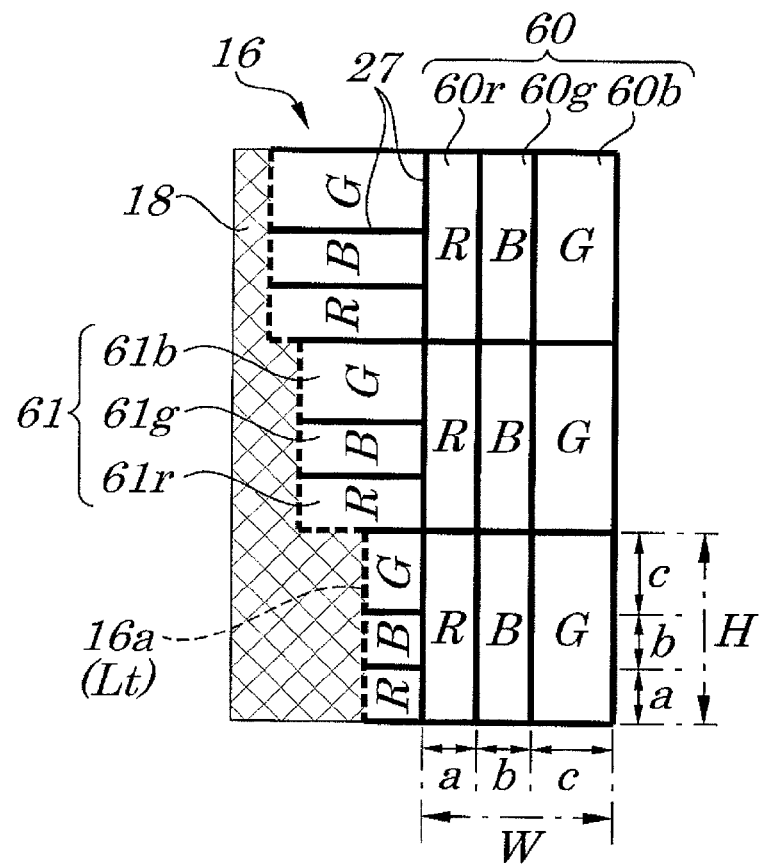
FIG. 19 is a partially enlarged plan view for showing a pixel arrangement around another end portion of the image display region of the image display device.
Figure 20:
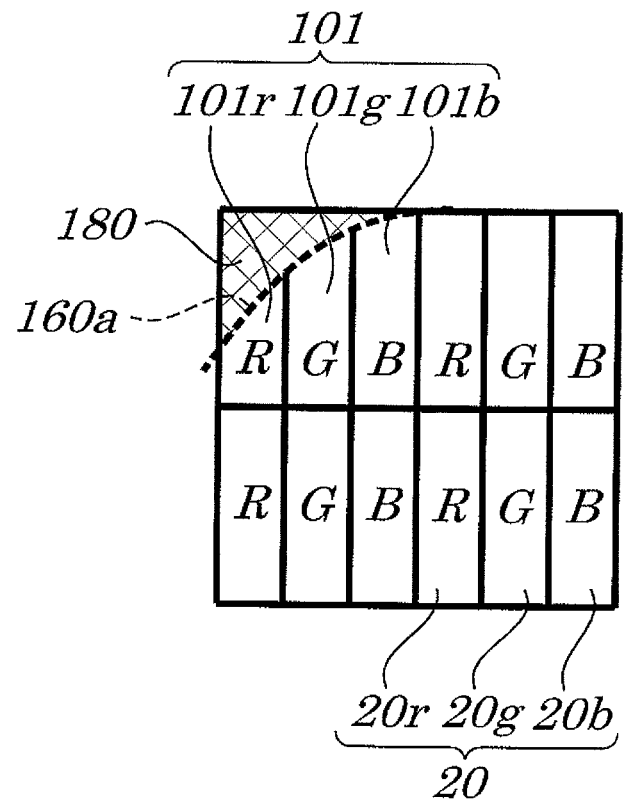
FIG. 20 is a partially enlarged plan view for showing a pixel arrangement of an image display device mounted on a cellular phone, according to a related technology of the present invention.
Figure 21:
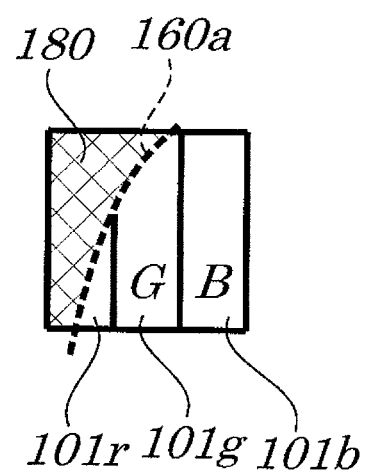
FIG. 21 is a partially enlarged plan view for showing a pixel arrangement, for explaining problems of the image display device.

FIG. 18 is a partially enlarged plan view for showing one enlarged portion of a pixel arrangement around one end portion of an image display region of an image display device according to the eighth exemplary embodiment of the present invention and FIG. 19 is a partially enlarged plan view for showing a pixel arrangement around another end portion of the image display region of the image display device.

Like the unit pixel 20 of liquid crystal of the above first exemplary embodiment, a circular display device 15 of a cellular phone (electronic device) of the present exemplary embodiment is configured by arraying unit pixels 60 each of which is made up of a self-luminous element, for example, an electro-luminescent (EL) element in an image display region 16, as shown in FIGS. 18 and 19. Since the EL elements have color-specific luminous efficiency, in each unit pixel 60, the width (area) of sub-pixels 60r, 60g, and 60b corresponding to the red (R), green (G), and blue (B) of the three primary colors is adjusted in accordance with their respective luminous efficiencies respectively so that they may have equal luminance. It is to be noted that generally, the green (G) EL element has a lower luminous efficiency than the R- and B-elements, so that in an EL display device having a tri-chromatic independent pixel structure, color balance is maintained by making the green (G) sub-pixel 60g larger in area than the other elements so that it may cooperate with the R- and B-subpixels 60r and 60b properly. That is, the sub-pixels 60r, 60g, and 60b are not equal in area but set to a certain ratio, for example, a:b:c.

Further, in accordance with its position on an outer edge 16a of the image display region 16 enclosed by a light-shielding layer 18, an end portion unit pixel 61 is formed smaller in area than the inner unit pixel 20. Further, end portion sub-pixels 61r, 61g, and 61b of the end portion unit pixel 60 are formed in such a manner as to have a relative area proportion equal to the inner sub-pixels 60r, 60g, and 60b of the inner unit pixel 60 while at the same time keeping their individual rectangular shapes and also, in accordance with the position on the outer edge 16a, the array direction of the end portion sub-pixels 61r, 61g, and 61b is changed.

Specifically, the end portion unit pixel 61 adjoining the outer edge 16a of the upper side or lower side of the image display region 16 in FIG. 8 has its end portion sub-pixels 61r, 61g, and 61b arrayed in the same lateral direction as the array direction of the inner sub-pixels 60r, 60g, and 60b of the inner unit pixel 60. Further, each end portion unit pixel 61 is formed smaller in area than the inner unit pixel 60 by shrinking the upper-side or lower-side portion of each of its the end portion sub-pixels 61r, 61g, and 61b in such a manner that those sub-pixels may have the same area ratio. On the other hand, also in the case of the end portion unit pixel 61 adjoining the left-side or the right-side (not shown) outer edge 16a of the image display region 16 in FIG. 18, its end portion sub-pixels 61r, 61g, and 61b are arrayed in a vertical direction perpendicular to the array direction of the inner sub-pixels 60r, 60g, and 60b of the inner unit pixel 60. Further, each end portion unit pixel 61 is formed smaller than the inner unit pixel 60 by shrinking the right-side or left-side portion of each of its the end portion sub-pixels 61r, 61g, and 61b in such a manner that those sub-pixels may have the same area ratio.

As can be seen from the above, in the present exemplary embodiment, almost the same operative effects as those of the first exemplary embodiment can be obtained also with the circular display device in which the unit pixel 60 is made up of an EL element, while like the inner unit pixel 60, the end portion sub-pixels 61r, 61g, and 61b of the end portion unit pixel 61 can turn the respective three colors at an area ratio that matches the luminance efficiencies of those colors. Therefore, color balance can be maintained at the outer edge 16a of the image display region 16.

While the invention has been particularly shown and described with reference to exemplary embodiments thereof, the invention is not limited to these exemplary embodiments. For example, although the exemplary embodiments have set the end portion unit pixel smaller in area than the inner unit pixel, they can have the same area at a portion where the outer edge (region borderline) runs in a vertical or horizontal direction of the device. Further, for example, the primary colors are not limited to three colors of red (R), green (G), and blue (B); the present invention can be applied to a case where four colors or more are employed. Further, although the exemplary embodiments have been described mainly about the TFT-type LCD, the present invention is not limited to it; it can be applied to a super twisted nematic (STN) type LCD. Further, although the eighth exemplary embodiment has employed the unit pixel made up of self-luminous type EL elements, the present invention is not limited to it; it can use the EL elements of any types including inorganic or organic ones as well as color self-luminous type elements other than the EL elements. Further, besides the self-luminous elements, the present invention can be applied to a variety of elements in which the areas of the colors need to be changed; for example, it can be applied also to the so-called pen tile technology etc. for working out proper shapes, sizes, and color mixture of the pixels in order to improve the essentially perceptible resolution for humans.

The present invention can be applied to a wide range of cellular phones as well as, for example, mobile electronic terminals such as a personal digital assistance (PDA). Besides the mobile terminals, it can be applied also to a clock, a digital photo-stand, a digital pendant, etc. capable of displaying multiple functions such as digital/analog time, calendars, temperatures, and atmospheric pressures.

What is claimed is:

1. A color filter substrate comprising:
    an end portion unit pixel formed in an edge portion of a display region in which a color image is displayed and including a plurality of kinds of end portion sub-pixels which correspond to a plurality of kinds of primary colors respectively in a one-to-one relationship; and
    an inner unit pixel formed in an inside of said display region with respect to said end portion unit pixels and including a plurality of kinds of inner sub-pixels which correspond to the plurality of kinds of primary colors respectively in a one-to-one relationship,
    wherein a relative area proportion of said end portion sub-pixels that correspond to the primary colors respectively in a one-to-one relationship is set equal to that of said inner sub-pixels that correspond to the primary colors respectively in a one-to-one relationship; and
    wherein said plurality of kinds of said end portion sub-pixels is arrayed in accordance with a position or a shape on an outer edge of said display region, an array direction of said plurality of kinds of said end portion sub-pixels and an array direction of said plurality of kinds of said inner sub-pixels configured to intersect each other.

2. A color pixel array substrate comprising:
    the color filter substrate according to claim 1; and
    a circuit substrate mounted with thin film transistors disposed in array configuration so that said sub-pixels on said color filter substrate may function and a scanning line connected to a gate terminal and a signal line connected to a source or drain terminal of said thin film transistor,
    wherein in said end portion unit pixel, the branch line that branches off from said scanning line or said signal line connected to said thin film transistor that causes said sub-pixels of said inner unit pixel neighboring itself to function is connected to the gate terminal or the source or drain terminal of the thin film transistor that causes said end portion sub-pixels to function.

3. A color pixel array substrate comprising:
    the color filter substrate according to claim 1; and
    a circuit substrate mounted with thin film transistors disposed in array configuration so that said sub-pixels on said color filter substrate may function and a scanning line connected to a gate terminal and a signal line connected to a source or drain terminal of said thin film transistor,
    wherein in said end portion unit pixel, the branch line that branches off from said scanning line connected to said thin film transistor that causes said sub-pixels of said inner unit pixel neighboring itself to function is connected to the gate terminal of the thin film transistor that causes said end portion sub-pixels to function; and
    wherein the signal line different from said signal line connected to said thin film transistor that causes said sub-pixels of said inner unit pixel to function is connected to the source or drain terminal of the thin film transistor that causes said end portion sub-pixels to function.

4. A color pixel array substrate comprising:

the color filter substrate according to claim 1, wherein said inner unit pixel is formed in such a manner to be non rectangular; and a circuit substrate mounted with transparent common electrodes and transparent pixel electrodes which are disposed in array configuration so that said sub-pixels on said color filter substrate may function, a thin film transistor whose drain or source terminal is connected to said transparent pixel electrode, and a scanning line connected to a gate terminal and a signal line connected to a source or drain terminal of said thin film transistor, wherein:

said end portion unit pixel is configured in such a manner that the direction in which an electric field occurs between the transparent pixel electrode and the transparent common electrode that cause said sub-pixels of said inner unit pixel neighboring itself to function may be nearly equal to the direction in which the electric field occurs between the transparent pixel electrode and the transparent common electrode that cause said end portion sub-pixels to function.

* * * * *